(12) United States Patent
Tachikawa

(10) Patent No.: US 12,208,707 B2
(45) Date of Patent: Jan. 28, 2025

(54) LATCH DEVICE AND VEHICLE SEAT

(71) Applicant: TS TECH CO., LTD., Asaka (JP)

(72) Inventor: Yoichi Tachikawa, Tochigi (JP)

(73) Assignee: TS TECH CO., LTD., Saitama (JP)

( * ) Notice: Subject to any disclaimer, the term of this patent is extended or adjusted under 35 U.S.C. 154(b) by 0 days.

(21) Appl. No.: 18/176,980

(22) Filed: Mar. 1, 2023

(65) Prior Publication Data

US 2023/0202351 A1 Jun. 29, 2023

Related U.S. Application Data

(63) Continuation of application No. 17/745,402, filed on May 16, 2022, now Pat. No. 11,618,347, which is a
(Continued)

(30) Foreign Application Priority Data

Jan. 29, 2018 (JP) ................................ 2018-012798

(51) Int. Cl.
*B60N 2/015* (2006.01)
*B60N 2/68* (2006.01)
(Continued)

(52) U.S. Cl.
CPC ..... *B60N 2/01541* (2013.01); *B60N 2/01583* (2013.01); *B60N 2/688* (2013.01); *B60R 22/26* (2013.01); *B60N 2/943* (2018.02)

(58) Field of Classification Search
None
See application file for complete search history.

(56) References Cited

U.S. PATENT DOCUMENTS 5,984,397 A 11/1999 Dawson et al.
6,123,379 A 9/2000 Yamada et al.
(Continued)

FOREIGN PATENT DOCUMENTS

CN 102470783 A 5/2012
CN 103597158 2/2014
(Continued)

OTHER PUBLICATIONS

International Search Report and Written Opinion issued for International Patent Application No. PCT/JP2019/000761, Date of mailing: Mar. 26, 2019, 20 pages including English translation.
(Continued)

*Primary Examiner* — David E Allred
(74) *Attorney, Agent, or Firm* — HSML P.C.

(57) ABSTRACT

A latch device includes a latch engageable with a rod portion of a striker, and is capable of transition to a locked state in which the latch is engaged with the rod portion and to an unlocked state in which the latch is disengaged from the rod portion, and includes a first shaft member that supports the latch in a manner that permits the latch to rotate, and a base member that supports the first shaft member. The base member is a unitary member which includes a first support wall disposed on one side of the latch and configured to support one end of the first shaft member, a second support wall disposed on an other side of the latch and configured to support an other end of the first shaft member, and a connecting wall that connects the first support wall and the second support wall.

10 Claims, 16 Drawing Sheets

Related U.S. Application Data continuation of application No. 16/965,363, filed as application No. PCT/JP2019/000761 on Jan. 11, 2019, now Pat. No. 11,390,188.

(51) Int. Cl.
*B60R 22/26* (2006.01)
*B60N 2/90* (2018.01)

(56) References Cited

U.S. PATENT DOCUMENTS

| | | | |
|---|---|---|---|
| 6,161,890 A | 12/2000 | Pesta et al. | |
| 6,334,601 B1 | 1/2002 | Hur et al. | |
| 6,715,841 B2 | 4/2004 | Christoffel et al. | |
| 7,410,217 B2* | 8/2008 | Inoue | B60N 2/366 |
| | | | 297/378.13 |
| 7,455,336 B2 | 11/2008 | Bäumchen et al. | |
| 7,740,317 B2 | 6/2010 | Yamada et al. | |
| 8,511,723 B2 | 8/2013 | Otsuka | |
| 8,708,377 B2 | 4/2014 | Ishikawa et al. | |
| 9,050,911 B2 | 6/2015 | Wieclawski et al. | |
| 9,346,374 B2 | 5/2016 | Sayama et al. | |
| 2002/0033624 A1* | 3/2002 | Konishi | B60N 2/366 |
| | | | 297/336 |
| 2002/0043605 A1 | 4/2002 | Hibino et al. | |
| 2003/0102709 A1 | 6/2003 | Christoffel et al. | |
| 2004/0124684 A1 | 7/2004 | Bonk | |
| 2006/0006673 A1 | 1/2006 | Christoffel et al. | |
| 2006/0066123 A1 | 3/2006 | Tsujibayashi et al. | |
| 2006/0208505 A1 | 9/2006 | Christoffel et al. | |
| 2007/0057555 A1 | 3/2007 | Woods et al. | |
| 2007/0170341 A1 | 7/2007 | Baumchen et al. | |
| 2007/0200411 A1* | 8/2007 | Inoue | B60N 2/366 |
| | | | 297/378.13 |
| 2008/0164711 A1 | 7/2008 | Zambon et al. | |
| 2009/0026790 A1 | 1/2009 | O'Connor et al. | |
| 2009/0033138 A1 | 2/2009 | Yamada et al. | |
| 2009/0145183 A1 | 6/2009 | Maeta et al. | |
| 2010/0026013 A1 | 2/2010 | Otsuka et al. | |
| 2010/0032967 A1 | 2/2010 | Otsuka | |
| 2010/0052370 A1* | 3/2010 | Fujisawa | B60N 2/305 |
| | | | 297/15 |
| 2010/0133412 A1 | 6/2010 | Imajo | |
| 2010/0207439 A1 | 8/2010 | Sayama | |
| 2011/0006576 A1* | 1/2011 | Muller | B60N 2/01583 |
| | | | 297/378.13 |
| 2011/0163582 A1 | 7/2011 | Nazione et al. | |
| 2011/0169279 A1 | 7/2011 | Ishikawa et al. | |
| 2012/0133188 A1 | 5/2012 | Wieclawski et al. | |
| 2012/0205959 A1 | 8/2012 | Pacolt | |
| 2012/0301212 A1 | 11/2012 | Champ et al. | |
| 2013/0285429 A1* | 10/2013 | Ohba | B60N 2/366 |
| | | | 297/367 P |
| 2014/0145057 A1 | 5/2014 | Sayama et al. | |
| 2014/0169873 A1* | 6/2014 | Kamata | B60N 2/01583 |
| | | | 403/384 |
| 2015/0076835 A1 | 3/2015 | Mitchell et al. | |
| 2015/0266400 A1 | 9/2015 | Muddana et al. | |
| 2015/0329019 A1 | 11/2015 | Abe et al. | |
| 2017/0174104 A1 | 6/2017 | Raja K | |
| 2017/0313210 A1 | 11/2017 | González Pérez | |
| 2018/0140484 A1 | 5/2018 | Moss | |
| 2018/0290565 A1 | 10/2018 | Tone et al. | |
| 2020/0001763 A1* | 1/2020 | Sayama | B60N 2/2245 |
| 2020/0086772 A1 | 3/2020 | Madhu | |
| 2021/0039524 A1 | 2/2021 | Smith et al. | |
| 2021/0394651 A1* | 12/2021 | Pejathaya | B60N 2/3011 |
| 2023/0166686 A1* | 6/2023 | Ozcan | B60N 2/919 |
| | | | 280/801.1 |

FOREIGN PATENT DOCUMENTS

| | | | |
|---|---|---|---|
| DE | 3726711 A1 * | 2/1988 | |
| FR | 2808747 | 11/2001 | |
| JP | 2006248330 | 9/2006 | |
| JP | 2007517721 | 7/2007 | |
| JP | 2007518000 | 7/2007 | |
| JP | 4007915 | 11/2007 | |
| JP | 2008143422 | 6/2008 | |
| JP | 2009057039 | 3/2009 | |
| JP | 2010116114 | 5/2010 | |
| JP | 2011144506 | 7/2011 | |
| JP | 2015020728 | 2/2015 | |
| JP | 5844075 B2 | 1/2016 | |
| WO | 2008108037 A1 | 9/2008 | |
| WO | 2008126479 | 10/2008 | |
| WO | WO-2012070095 A1 * | 5/2012 | B60N 2/01583 |
| WO | 2012173084 | 12/2012 | |
| WO | 2013094971 A1 | 6/2013 | |
| WO | 2017154307 | 9/2017 | |

OTHER PUBLICATIONS

Extended European Search Report issued for European Patent Application No. 19744499.5, dated Mar. 26, 2021, 7 pages.

Office Action issued for Indonesian Patent Application No. P-00202006328, dated Feb. 11, 2022, 6 pages including partial English translation providing a concise explanation of the relevance of the cited documents.

Office Action issued for Chinese Patent Application No. 201980010088.6, dated May 7, 2022, 18 pages including English translation.

Office Action issued for Indian Patent Application No. 202047030876, Date of Dispatch: Jun. 8, 2022, 6 pages.

Office Action issued for Chinese Patent Application No. 201980010088.6, dated Dec. 1, 2022, 28 pages including English translation.

* cited by examiner

FIG.11
(a)
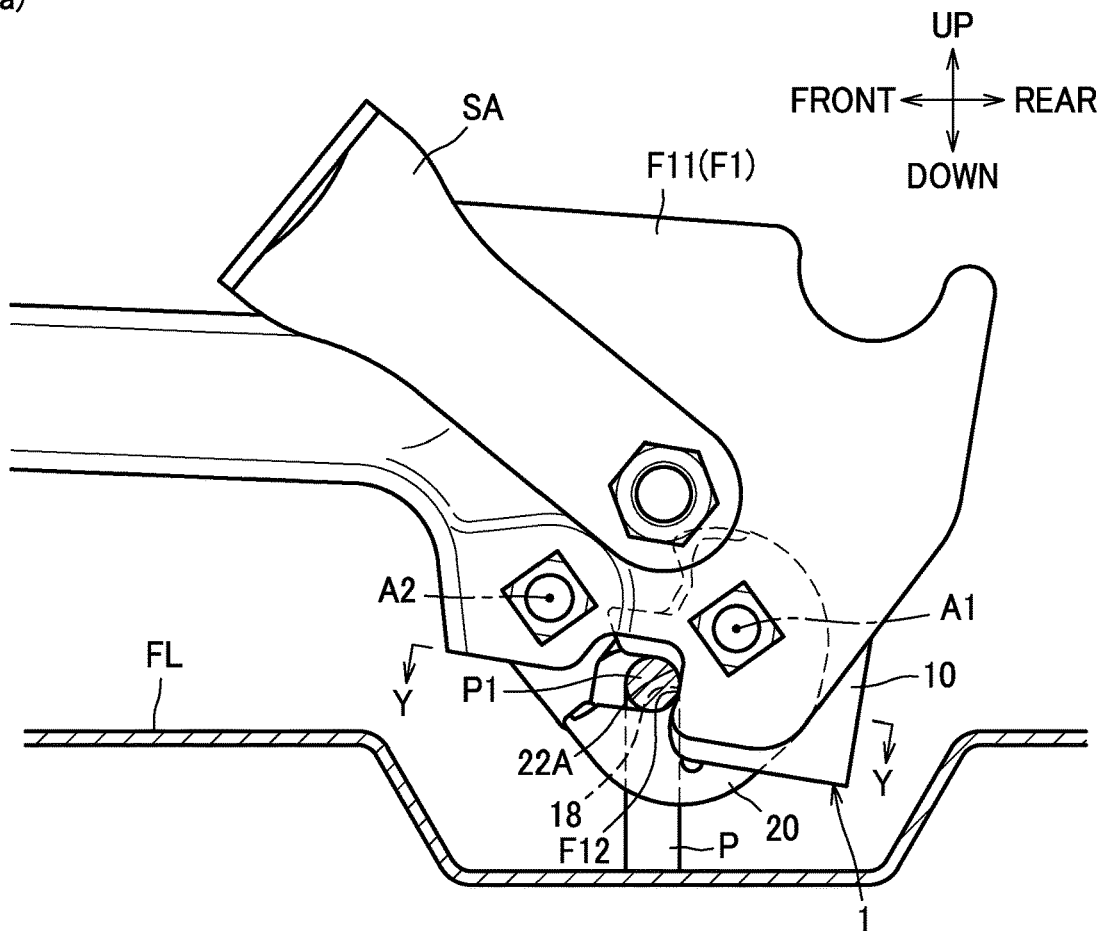
(b)
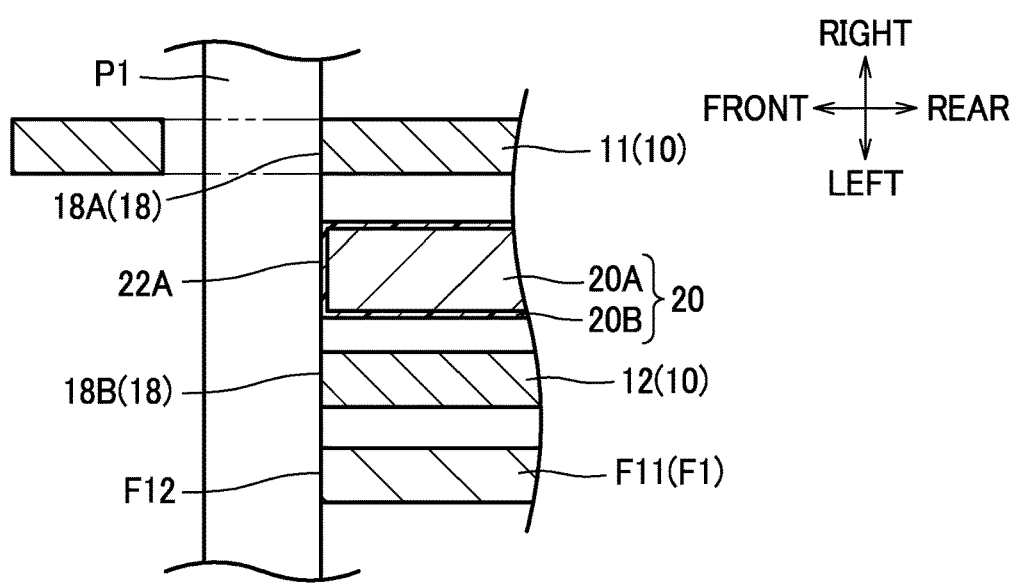

FIG.13
(a)
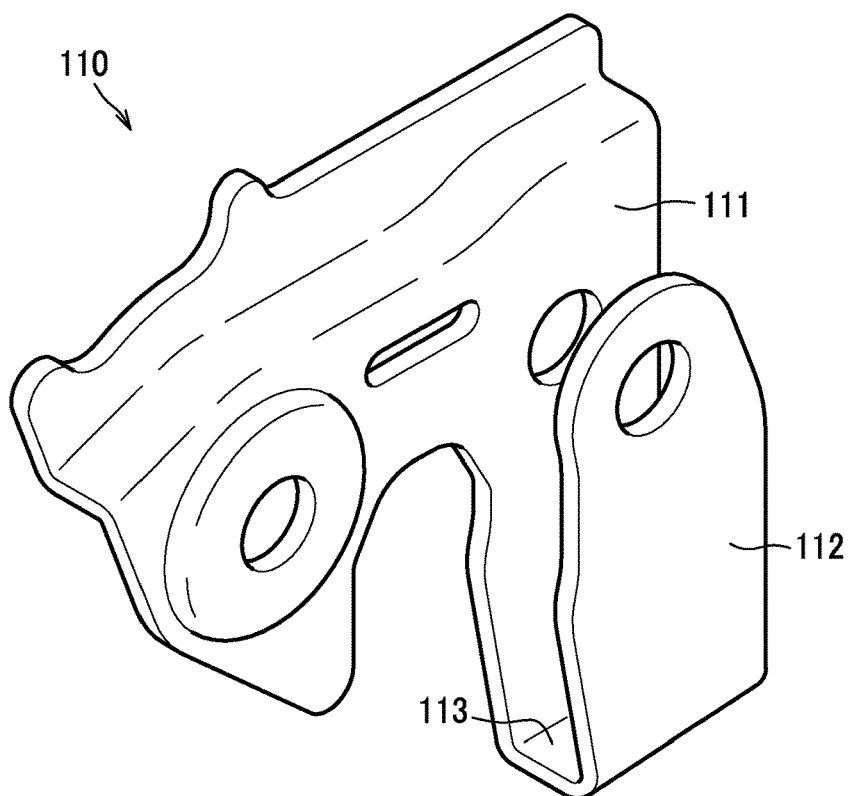
(b)
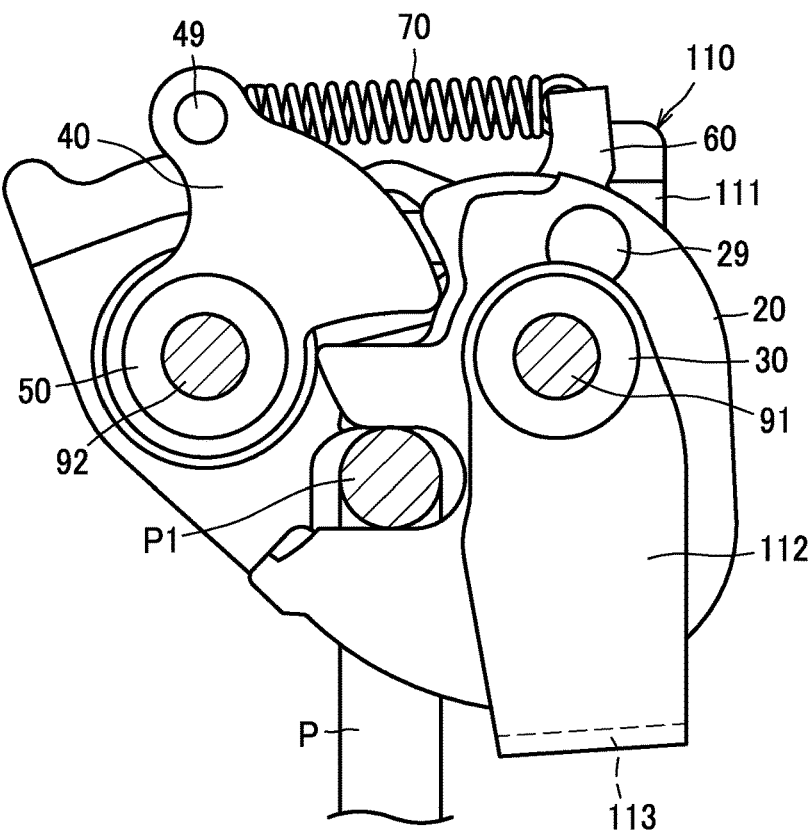

LATCH DEVICE AND VEHICLE SEAT

TECHNICAL FIELD

The present invention relates to a latch device including a latch engageable with a rod portion and a vehicle seat including the latch device.

BACKGROUND ART

Conventionally, a latch device including a latch engageable with a rod portion of a striker or the like and capable of transition to a locked state in which the latch is engaged with the rod portion and to an unlocked state in which the latch is disengaged from the rod portion is known in the art. For example, Patent Document 1 discloses a latch device comprising a latch, a latch shaft that supports the latch in a manner that permits the latch to rotate, and a base plate and a back plate that support the latch shaft. This latch device is assembled by arranging the latch between the base plate and the back plate and fixing both ends of the base plate and the back plate to one another by a bolt and a nut.

CITATION LIST

Patent Literature

Patent Document 1: JP 2006-248330 A

SUMMARY OF INVENTION

By the way, for latch devices or vehicle seats such as car seats including latch devices, reduction in the number of parts would be desirable for downsizing, weight reduction, cost reduction and the like.

Thus, it is an object of the present invention to provide a latch device and a vehicle seat that can be made with a reduced number of parts.

It is a further object to minimize deformation of a base member.

It is a further object to reduce the size and/or weight of the latch device.

It is a further object to reduce the load on a latch.

It is a further object to easily manufacture the base member.

It is a further object to improve the rigidity of the base member.

It is a further object to minimize twisting of the latch.

A latch device which achieves the aforementioned object includes a latch engageable with a rod portion and is capable of transition to a locked state in which the latch is engaged with the rod portion and to an unlocked state in which the latch is disengaged from the rod portion, the latch device comprising: a shaft member that supports the latch in a manner that permits the latch to rotate; and a base member that supports the shaft member, wherein the base member is formed as a unitary member which comprises a first support wall disposed on one side of the latch in a direction of a rotational axis of the latch and configured to support one end of the shaft member, a second support wall disposed on an other side of the latch in the direction of the rotational axis of the latch and configured to support an other end of the shaft member, and a connecting wall that connects the first support wall and the second support wall.

According to this configuration, the number of parts of the latch device can be reduced compared to the case where the latch is disposed between a base plate and a back plate.

In the aforementioned latch device, the shaft member may be fixed to the base member to restrict an increase in distance between the first support wall and the second support wall.

According to this configuration, deformation of the base member in the direction in which the distance between the first support wall and the second support wall would otherwise increase can be restricted. Further, the number of parts of the latch device can be reduced. Also, it is possible to reduce the size and/or weight of the base member, and thus to reduce the size and/or weight of the latch device.

In the aforementioned latch device, the latch may comprise a latch contact surface contactable with the rod portion in the locked state, and the base member may comprise a base contact surface disposed on a same side of the rod portion as a side on which the latch contact surface is disposed, the base contact surface being configured to be contactable with the rod portion in the locked state, together with the latch contact surface.

According to this, when the rod portion contacts the latch contact surface, it also contacts the base contact surface, and thus the load from the rod portion can be distributed between the latch and the base member. Thereby, the load on the latch can be reduced.

In the aforementioned latch device, the base contact surface may comprise a first contact surface formed on the first support wall, and a second contact surface formed on the second support wall.

According to this, the load from the rod portion can be distributed between the first support wall and the second support wall of the base member disposed on both sides of the latch. Thereby, the load on the latch can be further reduced.

In the aforementioned latch device, the first support wall, the second support wall and the connecting wall may form a U shape.

According to this, the base member including the first support wall, the second support wall and the connecting wall can easily be manufactured, for example, by bending a metal sheet.

In the aforementioned latch device, the first support wall may comprise: a first wall portion that supports the one end of the shaft member; a second wall portion disposed in a position different from a position of the first wall portion in the direction of the rotational axis, and disposed in a position different from a position of the first wall portion as viewed in the direction of the rotational axis; and a third wall portion that connects the first wall portion and the second wall portion.

According to this, since a stepped shape is formed on the first support wall 11, the rigidity of the base member 10 can be enhanced.

In the aforementioned latch device, a section connecting the first wall portion and the third wall portion, and a section connecting the second wall portion and the third wall portion may each include at least one arcuate portion as viewed in the direction of the rotational axis.

According to this, the rigidity of the base member can be further enhanced.

The aforementioned latch device may be configured to further comprise: a ratchet rotatably supported on the base member and configured to engage the latch to thereby maintain the locked state and the unlocked state; a lever member rotatably supported on the latch and configured to transfer motion of the ratchet to the latch; and a biasing member engaged with the ratchet and the lever member, wherein the lever member is formed as a unitary member which comprises a lever body, and a biasing member attachment portion with which the biasing member is engaged, the biasing member attachment portion extending from the lever body and bending to a side opposite to a side on which the latch is disposed in the direction of the rotational axis.

According to this, the number of parts of the latch device can be reduced.

The aforementioned latch device may be configured to comprise a load bearing member that contacts the rod portion and receives a load from the rod portion, wherein the first support wall includes a first wall portion configured to support the one end of the shaft member, a second wall portion disposed in a position different from a position of the first wall portion in the direction of the rotational axis, and disposed in a position different from a position of the first wall portion as viewed in the direction of the rotational axis, and a third wall portion that connects the first wall portion and the second wall portion and has an insert hole formed therein, and wherein the load bearing member includes a body portion that extends along the first wall portion toward the third wall portion, a hook portion that is engaged with an end of the first wall portion disposed opposite to the third wall portion, a first load bearing surface that is contactable with the rod portion and receives a load from the rod portion which load is directed from the end portion of the first wall portion toward the third wall portion, and an insert portion that projects from the body portion and is engaged with the insert hole.

According to this, since the insert portion is engaged with the insert hole in the third wall portion, it is possible to restrain the load bearing member from moving in the direction of the rotational axis when a load is applied from the rod portion to the first load bearing surface. It is thus possible to stably receive the load from the rod portion by the base member via the load bearing member.

In the aforementioned latch device, the load bearing member may be configured to include a second load bearing surface contactable with the end of the first wall portion.

According to this, the load imposed on the load bearing member from the rod portion can be stably received by the first wall portion (base member) via the second load bearing surface.

In the aforementioned latch device, the load bearing member may be configured to include a third load bearing surface that is contactable with the third wall portion.

According to this, the load imposed on the load bearing member from the rod portion can be stably received by the third wall portion (base member) via the third load bearing surface.

In the aforementioned latch device, the insert portion may be configured to include a claw that is engaged with the third wall portion in such a manner that the third wall portion is sandwiched between the claw and the body portion.

According to this, it is possible to restrain the load bearing member from moving in the direction of thickness of the third wall portion.

The aforementioned latch device may be configured such that the first wall portion includes an access groove in which the rod portion is located in the locked state, and the hook portion is engaged with the deepest portion of the access groove.

A vehicle seat which achieves the above object may be configured such that it comprises: a seat frame which forms a frame for a seat; and the aforementioned latch device fixed to the seat frame, wherein the seat frame comprises a frame contact surface disposed on a same side of the rod portion as a side on which the latch contact surface and the base contact surface are disposed, the frame contact surface being contactable with the rod portion in the locked state, together with the latch contact surface and the base contact surface.

According to this, since the rod portion also contacts the frame contact surface when it contacts the latch contact surface and the base contact surface, the load from the rod portion can be distributed among the latch, the base member, and the seat frame. Thereby, the load on the latch can be further reduced.

A vehicle seat which achieves the above object may be configured such that it comprises: the aforementioned latch device; a seat frame which forms a frame for a seat; a seatbelt anchor fixed to a side of the seat frame; and a fixing member configured to fix the latch device to the side of the seat frame, wherein the shaft member has a tubular shape, wherein the fixing member extends through an interior of the tubular-shaped shaft member and is fixed to the side of the seat frame, and wherein a location of a fixing point of the seat frame and the seatbelt anchor is different from a location of the fixing member as viewed in the direction of the rotational axis.

According to this, twisting of the latch can be minimized when the seat belt anchor is pulled.

BRIEF DESCRIPTION OF DRAWINGS

FIG. 11 (*a*) is a diagram showing the case where a large load is applied to move the seat forward in the locked state, and (*b*) a sectional view taken along Y-Y of (*a*).

FIG. 13 (*a*) is a perspective view of a base member, and (*b*) is a side view of a latch device according to a second modification.

DESCRIPTION OF EMBODIMENTS

Hereinafter, a description of an embodiment of the present invention will be given with reference to the accompanying drawings.

Figure 1:
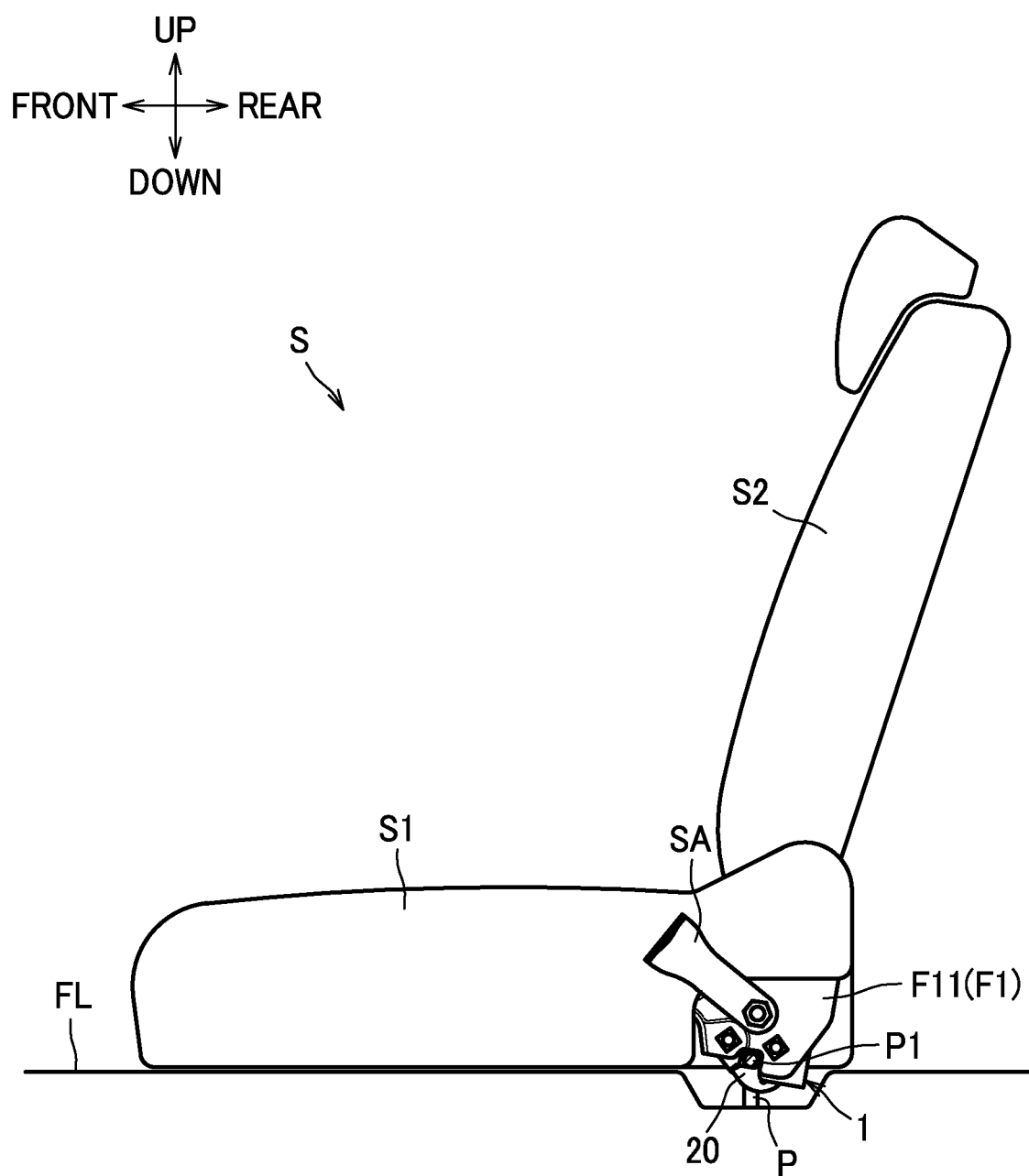
FIG. 1 is a side view of a vehicle seat including a latch device according to an embodiment.

As shown in FIG. 1, a vehicle seat of the present embodiment is configured as a car seat S installed on an automobile and mainly includes a seat cushion S1, a seat back S2, and a latch device 1. The seat cushion S1 includes a seat frame F1 which constitutes a frame for the seat cushion S1, and is formed by covering the seat frame F1 with a pad material made of urethane foam or the like and a covering material made of fabrics, leather or the like.

The seat frame F1 comprises left and right side frames F11 (only one is shown) arranged laterally apart. In the present embodiment, the latch device 1 is fixed to the left side frame F11. The latch device 1 includes a latch 20 and is configured to be capable of transition to a locked state in which the latch 20 is engaged with a rod portion P1 of a striker P provided on the car floor FL of a car and to an unlocked state (see FIG. 10) in which the latch 20 is disengaged from the rod portion P1. In the present embodiment, the front-rear, left-right and up-down directions are defined with respect to an occupant of a car seat S, although it is needless to say that the latch device 1 may be used in any position.

Figure 2:
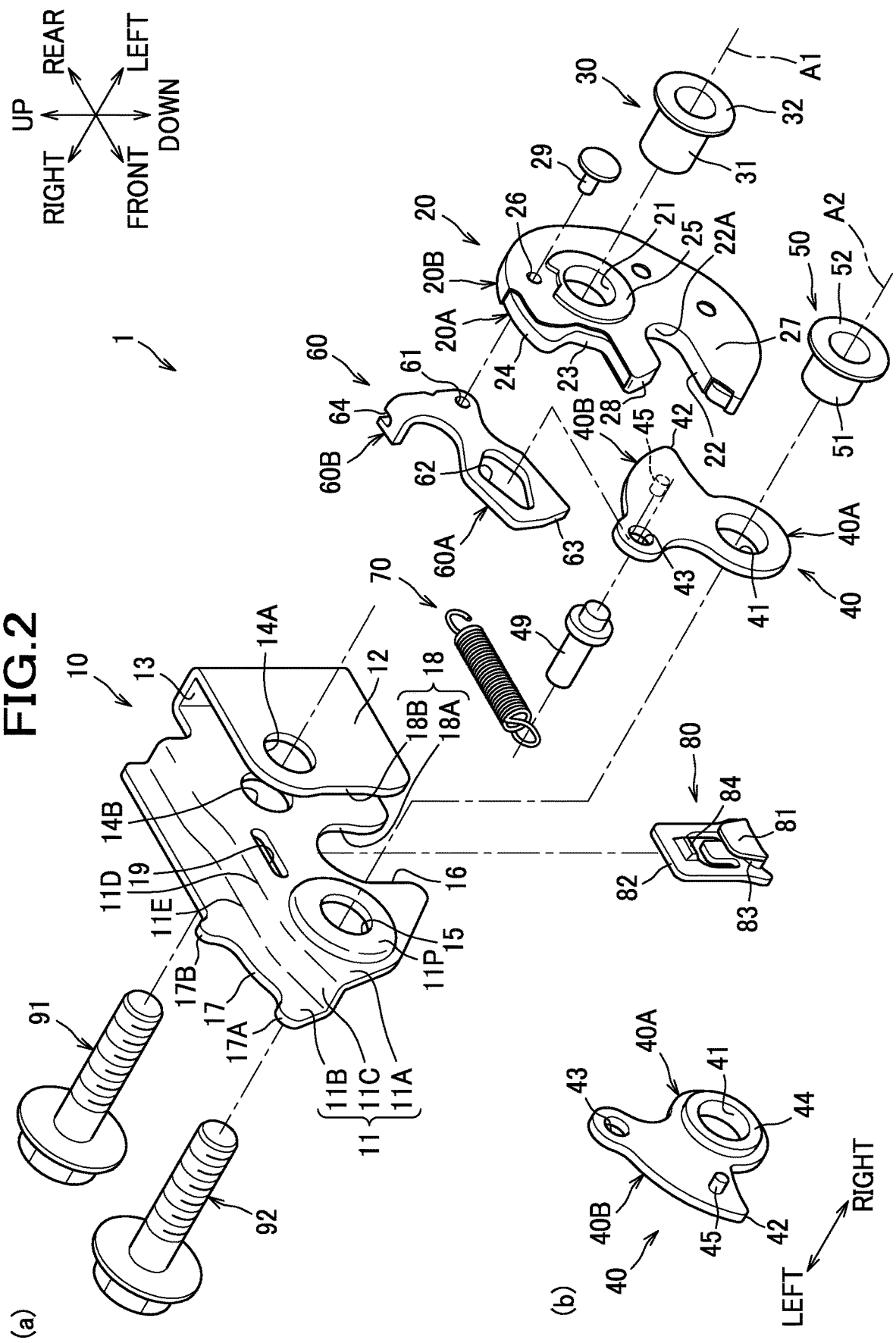
FIG. 2 (*a*) is an exploded perspective view of the latch device, and (*b*) is a perspective view of a ratchet.

As shown in FIG. 2(a), the latch device 1 mainly comprises a base member 10, a latch 20, a first shaft member 30 as a shaft member, a ratchet 40, a second shaft member 50, a lever member 60, a tension spring 70 as a biasing member, and a load bearing member 80.

The base member 10 is a member that supports components such as the latch 20 and the ratchet 40 and is made of sheet steel. Details of the base member 10 will be described afterwards.

The latch 20 is a member engageable with the rod portion P1 of the striker P (see FIG. 3) and includes a first opening 21, an engagement groove 22, a lock recess 23 and an open abutment surface 24. The first opening 21 is a through hole that passes through the latch 20 in the left-right direction. The latch 20 has its first opening 21 fitted and rotatably supported on the first shaft member 30, and thus is rotatably supported on the base member 10 via the first shaft member 30. A tubular projection 25 nearly in the shape of a hollow cylinder is formed on a side surface of the latch 20, the tubular projection 25 projecting from the periphery of the first opening 21 in a direction of a rotational axis of the latch 20 (hereinafter referred to as "the direction of the rotational axis") which corresponds to the left-right direction (see also FIG. 4). On the upper side of the first opening 21 there is formed a pin hole 26 into which a pin 29 that rotatably supports the lever member 60 is press-fitted.

Figure 3:
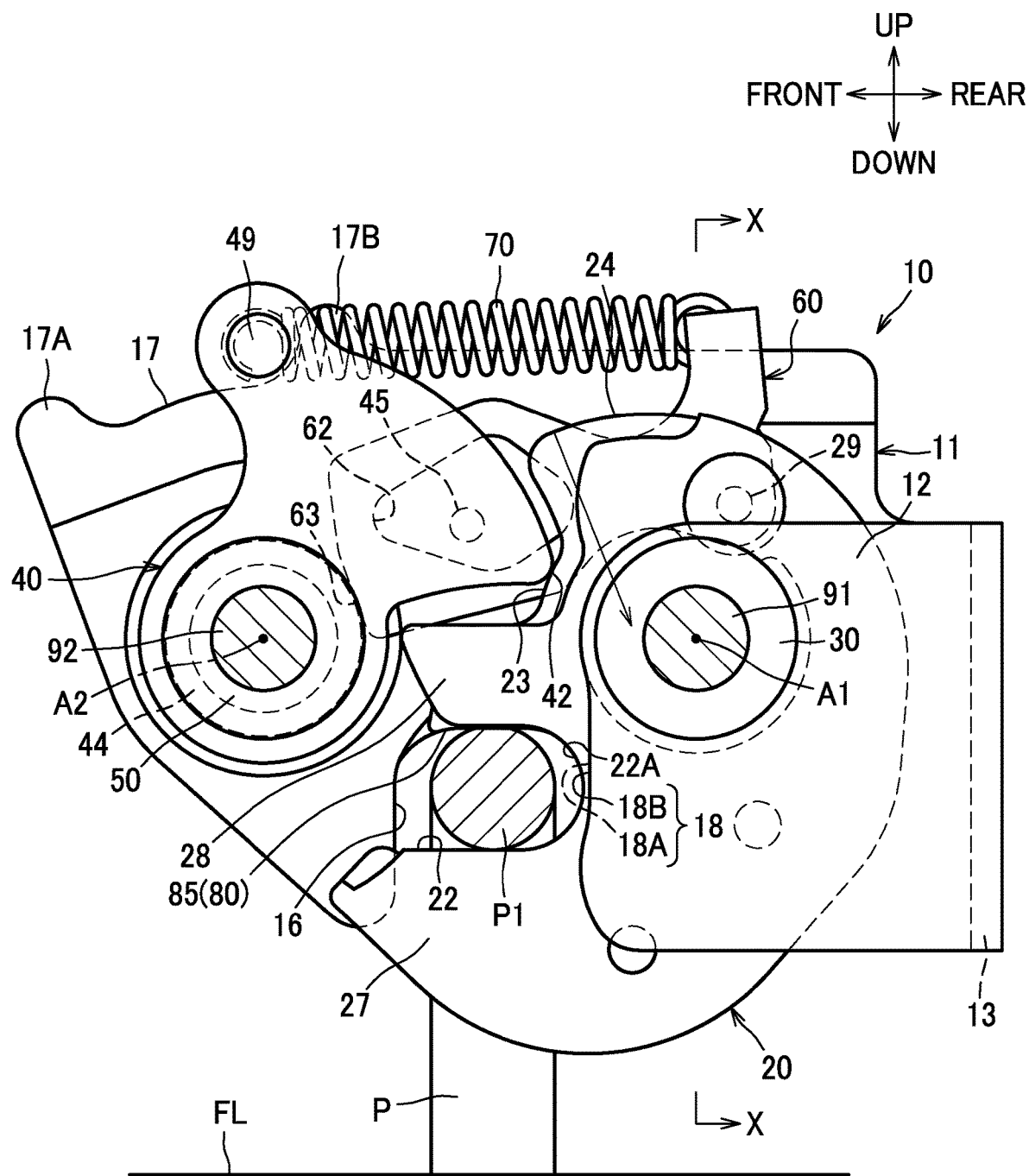
FIG. 3 is a diagram showing the latch device in a locked state.

The engagement groove 22 is a groove that is engaged with the rod portion P1 of the striker P and opens toward the front. The latch 20 is configured such that a portion on the lower side of the engagement groove 22 forms a hook portion 27, and a portion on the upper side of the engagement groove 22 facing the hook portion 27 forms a projection portion 28. The lock recess 23 is a recess dented toward the first opening 21 which is formed on the upper side of the engagement groove 22. The open abutment surface 24 is a part of the outer periphery of the latch 20 adjacent to the upper side of the lock recess 23, and is contacted by the ratchet 40 in the unlocked state to maintain the latch 20 in an unlocked state position. As shown in FIG. 3, the open abutment surface 24 is a convex curved surface projecting outward on the latch 20 and the direction toward the center of curvature of the open abutment surface 24 (refer to the arrow) is displaced to one side, specifically the front side, of a rotational axis A1 of the latch 20, over the whole range with which the ratchet 40 is abutable.

The latch 20 has a latch contact surface 22A which is contactable with the rod portion P1 of the striker P in the locked state. The latch contact surface 22A is a bottom (rear) surface of the engagement groove 22 and is disposed on the rear side of the rod portion P1 in the locked state.

Returning to FIG. 2(a), the latch 20 includes a latch body 20A formed by stamping sheet steel, and a plastic cover 20B formed by insert molding so as to cover a part of the latch body 20A. The cover 20B covers the inner periphery of the first opening 21 and the inner surface of the engagement groove 22. The tubular projection 25 is formed of plastic as part of the cover 20B. On the other hand, the inner surface of the lock recess 23 and the open abutment surface 24 are not covered with the cover 20B and the metal latch body 20A is exposed. The tip of the hook portion 27 that catches the rod portion P1 is also not covered with the cover 20B and the latch body 20A is exposed.

The first shaft member 30 is a member that supports the latch 20 in a manner that permits the latch 20 to rotate and includes a first tubular portion 31 formed nearly in a shape of a hollow cylinder, and a first flange portion 32 formed on one end of the first tubular portion 31.

The ratchet 40 is a member that is engaged with the latch 20 to maintain the locked state and the unlocked state, and is made of sheet steel. The ratchet 40 includes a base portion 40A in which a second opening 41 is formed, and an action portion 40B nearly in the shape of a fan. The second opening 41 is a hole which passes through the ratchet 40 in the direction of the rotational axis. The ratchet 40 has its second opening 41 fitted and rotatably supported on the second shaft member 50, and thus is rotatably supported on the base member 10 via the second shaft member 50. The rotational axis A2 of the ratchet 40 is parallel with the rotational axis A1 of the latch 20.

A rearside corner of the action portion 40B is configured as a lock engagement portion 42 that abuts the latch 20. The lock engagement portion 42, in the locked state, enters the lock recess 23 and functions to maintain the latch 20 in a locked state position, and, in the unlocked state, abuts the open abutment surface 24 of the latch 20 and functions to maintain the latch 20 in an unlocked state position. A rivet hole 43 to which a rivet 49 is connected is formed in the front end of the action portion 40B. A cable, rod or the like connected to an actuation member such as a lever (not shown) for actuating the latch device 1 is connected directly, or indirectly via another member, to the rivet 49 fixed to the ratchet 40. The ratchet 40 is configured to rotate about the rotational axis A2 through actuation of the actuation member which causes the cable or the like to be pulled and causes the rivet 49 to be pulled or pushed.

As shown in FIG. 2(b), the ratchet 40 includes a restriction portion 44 formed on the base portion 40A, and a projection 45 formed on the action portion 40B. The restriction portion 44 is a portion nearly in the shape of a hollow cylinder, projecting to the right from the periphery of the second opening 41. The restriction portion 44 projects by a length corresponding to a thickness of the lever member 60, and functions to limit play of the lever member 60 in the locked state effected by the lever member 60 biased by a tension spring 70 abutting the outer peripheral surface of the restriction portion 44. The projection 45 is a nearly cylindrical columnar portion projecting to the right from a side surface of the action portion 40B at a location frontward of the lock engagement portion 42.

As shown in FIG. 2(a), the second shaft member 50 is a member that supports the ratchet 40 in a manner that permits the ratchet 40 to rotate and includes a second tubular portion 51 formed substantially as a hollow cylinder, and a second flange portion 52 formed on one end of the second tubular portion 51.

The lever member 60 is a member that transfers motion of the ratchet 40 to the latch 20 and is made of sheet steel. The lever member 60 includes a lever body 60A, and a spring attachment portion 60B as a biasing member attachment portion. The lever body 60A is enlongated in the front-rear direction and has a shaft hole 61, and a nearly diamond-shaped guide hole 62. The shaft hole 61 is formed in the rear end portion of the lever body 60A. The lever member 60 is rotatably supported on the latch 20 with the shaft hole 61 rotatably fitting on a pin 29 fixed on the latch 20. The projection 45 formed on the ratchet 40 is located in the guide hole 62. The frontward edge of the lever body 60A forms a stopping surface 63 which abuts the restriction portion 44 of the ratchet 40 and limits play of the lever member 60. The spring attachment portion 60B extends from an upper end of the rear end portion of the lever body 60A and bends in a direction opposite to the side on which the latch 20 is disposed in the direction of the rotational axis, specifically, to the right. A spring engagement portion 64 with a shape dented toward the front is formed on the rear surface of the spring attachment portion 60B. The lever body 60A and the spring attachment portion 60B of the lever member 60 are integrally formed by stamping and bending sheet steel by presswork. That is, the lever member 60 is a unitary member including the lever body 60A and the spring attachment portion 60B.

The tension spring 70 is a member that provides a biasing force constantly pulling the rivet 49 connected to the ratchet 40 and the spring attachment portion 60B of the lever member 60 toward each other, with one end engaging the ratchet 40 via the rivet 49 and the other end engaging the spring engagement portion 64 formed on the spring attachment portion 60B of the lever member 60. The biasing force of the tension spring 70 also acts as a force that presses the lock engagement portion 42 of the ratchet 40 against the outer periphery of the latch 20.

The base member 10 rotatably supports the latch 20 by supporting the first shaft member 30, and rotatably supports the ratchet 40 by supporting the second shaft member 50. The base member 10 includes a first support wall 11, a second support wall 12, and a connecting wall 13.

Figure 4:
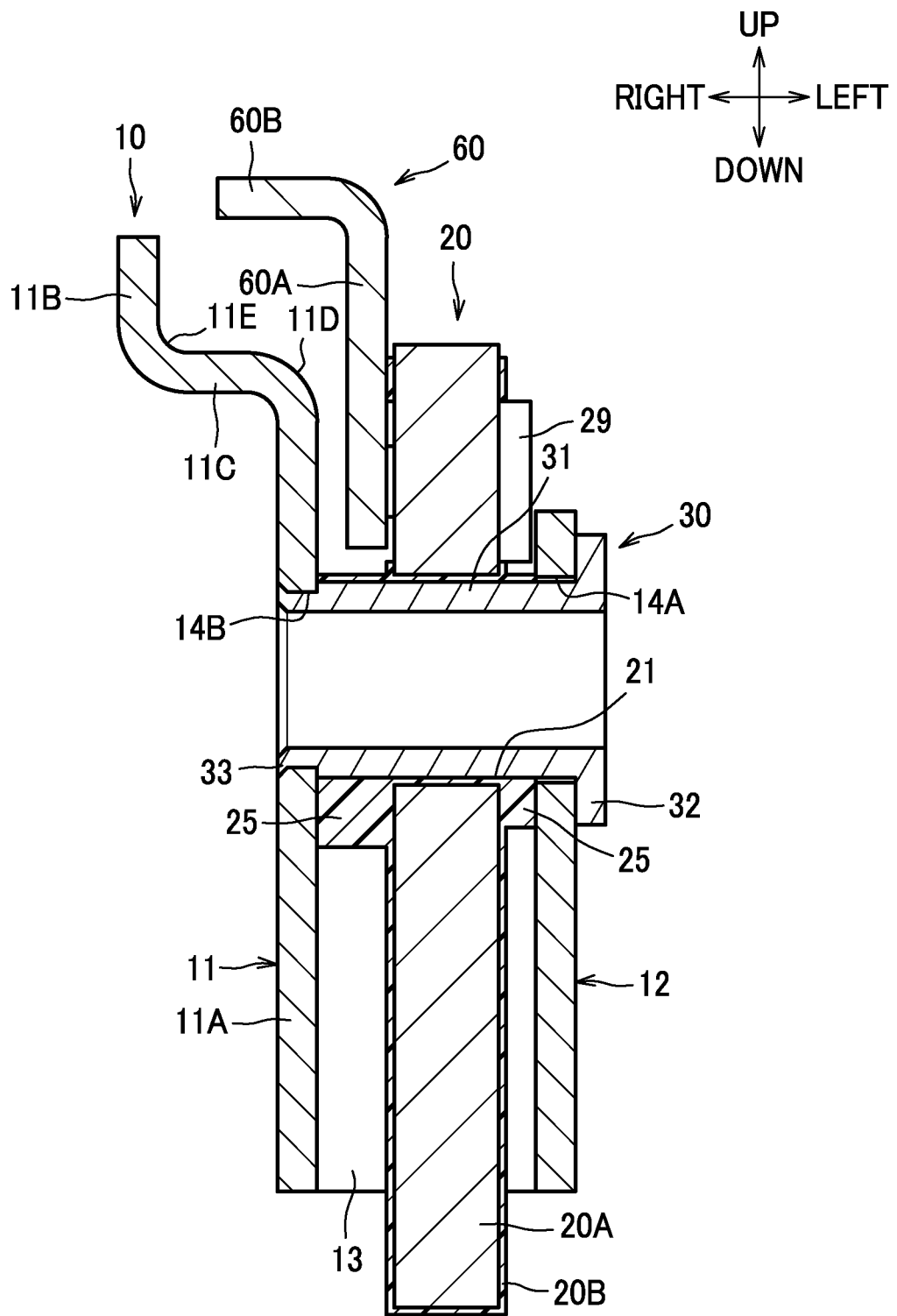
FIG. 4 is a sectional view taken along X-X of FIG. 3.

The first support wall 11 is a wall that supports one end of the first shaft member 30 and one end of the second shaft member 50, and the second support wall 12 is a wall that supports the other end of the first shaft member 30. As shown in FIG. 4, the first support wall 11 is disposed on one side of the latch 20 in the direction of the rotational axis, and the second support wall 12 is disposed on the other side of the latch 20 in the direction of the rotational axis. Specifically, the first support wall 11 is disposed on the right side of the latch 20 and the second support wall 12 is disposed on the left side of the latch 20. Accordingly, the first support wall 11 and the second support wall 12 are disposed so as to sandwich the latch 20 in the direction of the rotational axis. Returning to FIG. 2(a), the first support wall 11 is enlongated in the front-rear direction, and the second support wall 12 is formed so as to face the rear end of the first support wall 11 in the direction of the rotational axis.

The connecting wall 13 is a wall connecting the first support wall 11 and the second support wall 12 and is disposed so as to face the latch 20 in a direction orthogonal to the direction of the rotational axis. In the present embodiment, the connecting wall 13 is disposed on the rear side of the latch 20. The connecting wall 13 extends in the direction of the rotational axis and connects the rear ends of the first support wall 11 and the second support wall 12. The first support wall 11, the second support wall 12 and the connecting wall 13 form a U shape as viewed in the up-down direction. The base member 10 is formed by bending sheet steel by presswork and is integrally formed of the first support wall 11, the second support wall 12 and the connecting wall 13. That is, the base member 10 is a unitary member including the first support wall 11, the second support wall 12 and the connecting wall 13.

The first support wall 11 includes a first wall portion 11A, a second wall portion 11B, and a third wall portion 11C. The first wall portion 11A is a portion that supports one end of the first shaft member 30 and one end of the second shaft member 50. The base member 10 includes a first latch support hole 14A formed in the second support wall 12, a second latch support hole 14B formed in the first wall portion 11A of the first support wall 11, a ratchet support hole 15, and an access groove 16. The first latch support hole 14A and the second latch support hole 14B are holes that are engaged with the first tubular portion 31 of the first shaft member 30, and the ratchet support hole 15 is a hole that is engaged with the second tubular portion 51 of the second shaft member 50. The first latch support hole 14A, the second latch support hole 14B, and the ratchet support hole 15 are through holes provided in the direction of the rotational axis. The access groove 16 is a groove in which the rod portion P1 of the striker P is located in the locked state and is open toward the lower side.

The second latch support hole 14B is disposed farther rearward relative to the access groove 16, and the ratchet support hole 15 is disposed farther frontward relative to the access groove 16. In other words, the access groove 16 is positioned between the second latch support hole 14B and the ratchet support hole 15 with respect to the front-rear direction. The first latch support hole 14A is disposed so as to overlap the second latch support hole 14B as viewed in the direction of the rotational axis. In the present embodiment, the ratchet support hole 15 is formed in a nearly circular reinforcing projection 11P that projects further toward one side in the direction of the rotational axis than the portion of the first wall portion 11A in which the second latch support hole 14B is formed, specifically, to the left side. That is, the first wall portion 11A of the base member 10 is configured such that the portion (reinforcing projection 11P) on which the ratchet 40 is attached via the second shaft member 50 projects further to the left than the portion on which the latch 20 is attached via the first shaft member 30.

Figure 5:
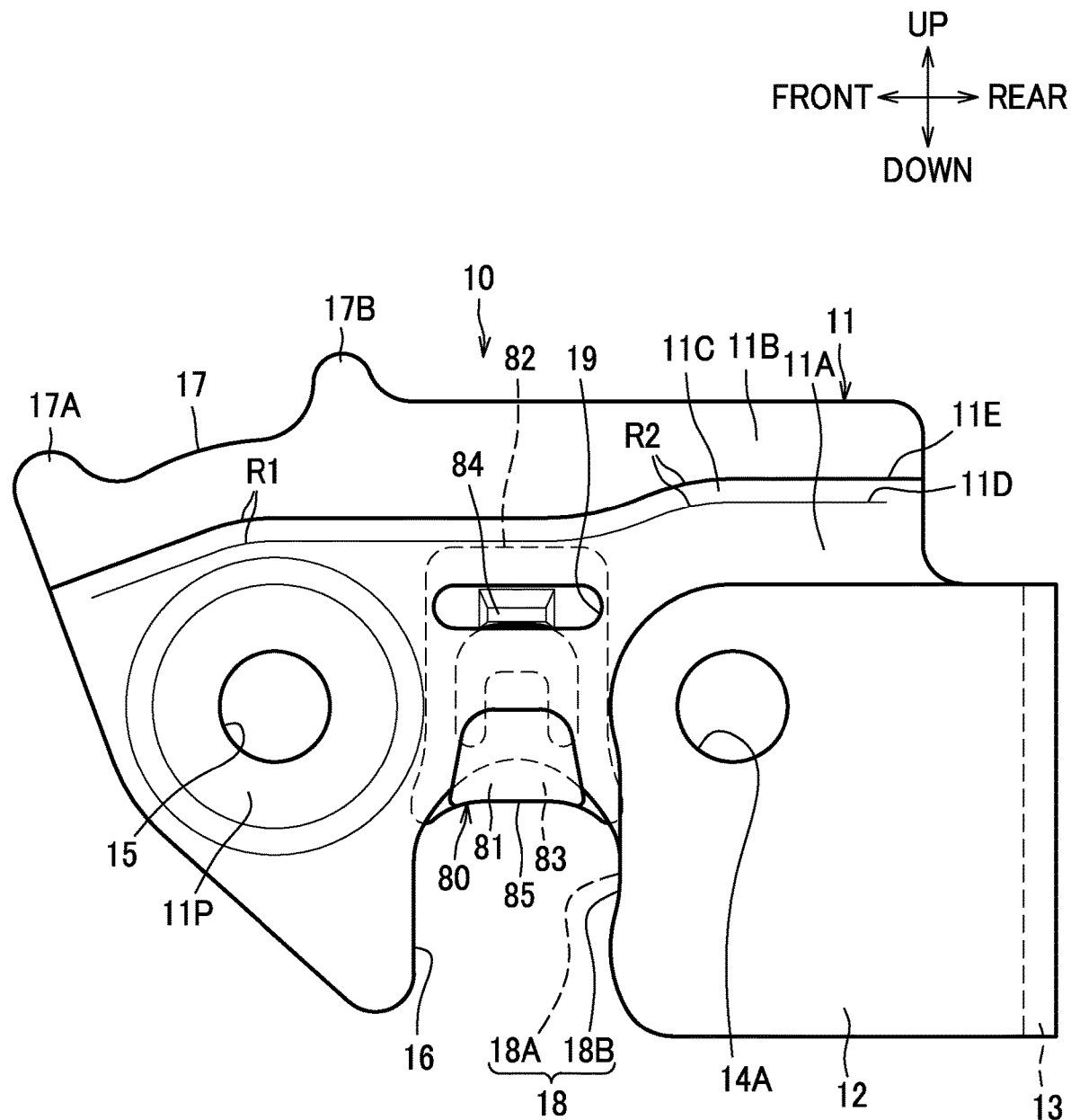
FIG. 5 is a side view of a base member with a load bearing member attached thereto.

The second wall portion 11B of the first support wall 11 is disposed in a position different from a position of the first wall portion 11A in the direction of the rotational axis. Specifically, the second wall portion 11B is disposed further to the right relative to the first wall portion 11A. Further, as shown in FIG. 5, the second wall portion 11B is disposed in a position different from a position of the first wall portion 11A as viewed in the direction of the rotational axis. Specifically, the second wall portion 11B is disposed higher than the first wall portion 11A. The second wall portion 11B includes a guide recess 17 on an upper edge of a front end thereof. The guide recess 17 is formed between two restriction projections 17A, 17B projecting upwards. The bottom surface of the guide recess 17 is formed nearly in the shape of an arc of which the center of curvature coincides with the rotational axis A2 of the ratchet 40 (see FIG. 3). The rivet 49 connected to the ratchet 40 is positioned in the guide recess 17 (see FIG. 3).

The third wall portion 11C is the portion connecting the first wall portion 11A and the to second wall portion 11B. In more detail, the third wall portion 11C extends in the direction of the rotational axis and connects the upper end of the first wall portion 11A and the lower end of the second wall portion 11B. The first support wall 11 includes a first connecting section 11D that is a section connecting the first wall portion 11A and the third wall portion 11C, and a second connecting section 11E that is a section connecting the second wall portion 11B and the third wall portion 11C. The first connecting section 11D and the second connecting section 11E each have a shape including two nearly arcuate portions. Specifically, the first connecting section 11D and the second connecting section 11E each have a shape in which a first arcuate portion R1 and a second arcuate portion R2 are aligned in the front-rear direction. The arcuate portions R1, R2 each have a shape with a nearly convex curved surface projecting upward.

As shown in FIG. 2(a) and FIG. 3, the base member 10 further includes a base contact surface 18. The base contact surface 18 is a surface contactable with the rod portion P1 of the striker P in the locked state, together with the latch contact surface 22A of the latch 20. In the locked state, the base contact surface 18 is disposed on the rear side of the rod portion P1, on the same side as that on which the latch contact surface 22A of the latch 20 is disposed. In the present embodiment, the base contact surface 18 includes a first contact surface 18A formed on the first support wall 11, and a second contact surface 18B formed on the second support wall 12. Specifically, the first contact surface 18A is the rear surface of the access groove 16, and the second contact surface 18B is the front surface of the second support wall 12. The first contact surface 18A and the second contact surface 18B are disposed so as to overlap each other as viewed in the direction of the rotational axis.

As shown in FIG. 4, the first shaft member 30 is fixed to the base member 10 together with the latch 20 by arranging the first tubular portion 31 through the first latch support hole 14A of the second support wall 12, the first opening 21 of the latch 20, and the second latch support hole 14B of the first support wall 11, and spreading and clinching the tip of the first tubular portion 31. The first shaft member 30 fixed to the base member 10 includes a spread clinched portion 33 on the tip of the first tubular portion 31. The first shaft member 30 restrains the second support wall 12 from moving away from the first support wall 11 by the first flange portion 32, and restrains the first support wall 11 from moving away from the second support wall 12 by the clinched portion 33. In this way, the first shaft member 30 restricts the increase in distance between the first support wall 11 and the second support wall 12.

On the other hand, the second shaft member 50 shown in FIG. 2(a) is fixed to the reinforcing projection 11P of the base member 10 together with the ratchet 40 by arranging the second tubular portion 51 through the second opening 41 of the ratchet 40 and the ratchet support hole 15 of the first support wall 11, and spreading and clinching the tip of the second tubular portion 51.

The load bearing member 80 is a member that contacts the rod portion P1 of the striker P and is subjected to a load from the striker P (rod portion P1), and is made of plastic. The load bearing member 80 has a nearly U-shaped cross section which includes a first clamping portion 81 and a second clamping portion 82 spaced apart in the direction of the rotational axis, and a connecting portion 83 which connects the lower sections of the first clamping portion 81 and the second clamping portion 82. The distance between the first clamping portion 81 and the second clamping portion 82 is almost the same as the sheet thickness of the base member 10. The connecting portion 83 is formed so that the upper surface thereof is contoured to follow the shape of the bottom (upper) surface of the access groove 16. As shown in FIG. 5, the load bearing member 80 is attached to the base member 10 with the first clamping portion 81 and the second clamping portion 82 sandwiching the portion of the support wall 11 on the upper side of the access groove 16 and with the connecting portion 83 disposed on the bottom side of the access groove 16. The second clamping portion 82 is formed with an engagement lug 84 that is engaged with an engagement hole 19 formed in the first wall portion 11A of the first support wall 11. The underside surface of the connecting portion 83 forms a load bearing surface 85 that contacts the rod portion P1.

Figure 6:
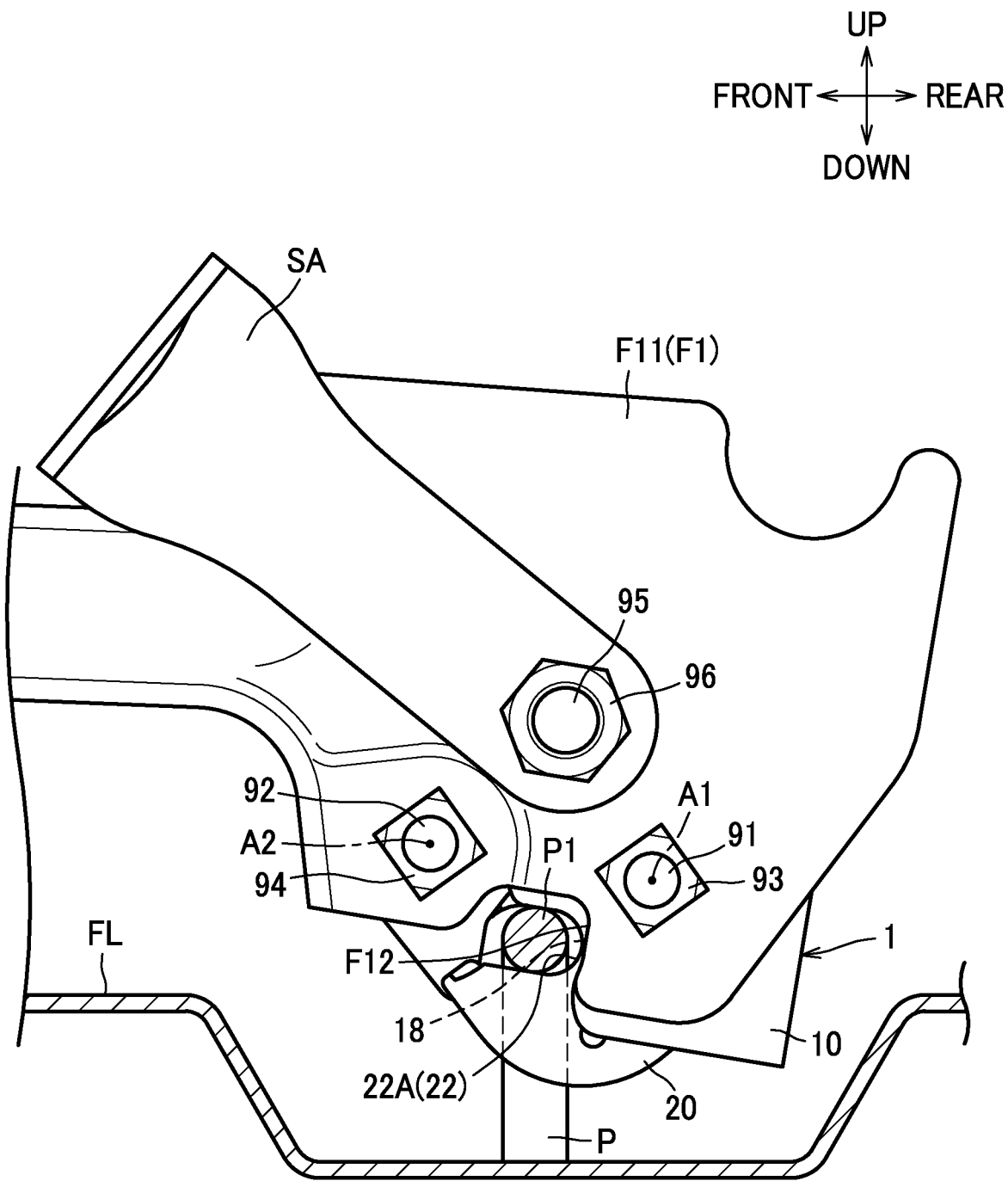
FIG. 6 is a side view of a rear end of a side frame, the latch device, and a seat belt anchor.

As shown in FIG. 2(a) and FIG. 6, the latch device 1 is fixed to the side frame F11 by bolts 91, 92 and nuts 93, 94. Specifically, the latch device 1 is disposed to face the inner side surface of the side frame F11 in the direction of the rotational axis. The bolt 91 extends from the inner side of the side frame F11 in the direction of the rotational axis, through the interior of the first tubular portion 31 of the first shaft member 30 and a first hole (not shown) formed in the side frame F11, and is fastened to a nut 93 fixed to the side frame F11. The bolt 92 extends from the inner side of the side frame F11 in the direction of the rotational axis, through the interior of the second tubular portion 51 of the second shaft member 50 and a second hole (not shown) formed in the side frame F11, and is fastened to a nut 94 fixed to the side frame F11. In this way, the latch device 1 is fixed to the side surface of the side frame F11 facing inward in the direction of the rotational axis. The bolt 91 is an example of a fixing member for fixing the latch device 1 to the side surface of the seat frame F1.

As shown in FIG. 6, the side frame F11 has a frame contact surface F12. The frame contact surface F12 is a surface contactable with the rod portion P1 of the striker P in the locked state, together with the latch contact surface 22A of the latch 20 and the base contact surface 18 of the base member 10. The base contact surface 18 is disposed on the rear side of the rod portion P1 in the locked state which is the same side of the rod portion P1 on which the latch contact surface 22A and the base contact surface 18 are disposed. The frame contact surface F12 is disposed so as to overlap the base contact surface 18 (the first contact surface 18A and the second contact surface 18B) as viewed in the direction of the rotational axis.

A seat belt anchor SA is fixed on the side frame F11. Specifically, the seat belt anchor SA is arranged on a side surface of the side frame F11 facing outward in the direction of the rotational axis, with a hole (not shown) formed in the lower end portion thereof being fitted onto a bolt 95 fixed to the side frame F11, from the outside of the side frame F11 in the direction of the rotational axis, and is fixed to the side surface of the side frame F11 facing outward in the direction of the rotational axis, by fastening a nut 96 on the bolt 95. A fixing point (bolt 95) of the seat frame F1 and the seat belt anchor SA is located in a position different from a position of the fixing point (bolt 91) of the seat frame F1 and the latch device 1 as viewed in the direction of the rotational axis. Specifically, the bolt 95 is positioned diagonally frontward above of the bolt 91. Further, the bolt 95 is positioned between the bolt 91 and the bolt 92 in the front-rear direction.

The operation of the latch device 1 will now be described. In FIGS. 7 to 10, different types of lines are used to illustrate the latch 20, the ratchet 40, and the lever member 60 to facilitate understanding.

In the locked state shown in FIG. 3, the rod portion P1 of the striker P is located in the access groove 16 of the base member 10, and the latch 20 is engaged with the rod portion P1 with the hook portion 27 holding the rod portion P1 from below. The lock engagement portion 42 of the ratchet 40 is located in the lock recess 23 of the latch 20 and restricts rotation of the latch 20. In the locked state, the tension spring 70 produces a tensile force, and the lock engagement portion 42 abuts the bottom surface of the lock recess 23. Further, in the locked state, the rod portion P1 abuts the load bearing surface 85 of the load bearing member 80.

Figure 7:
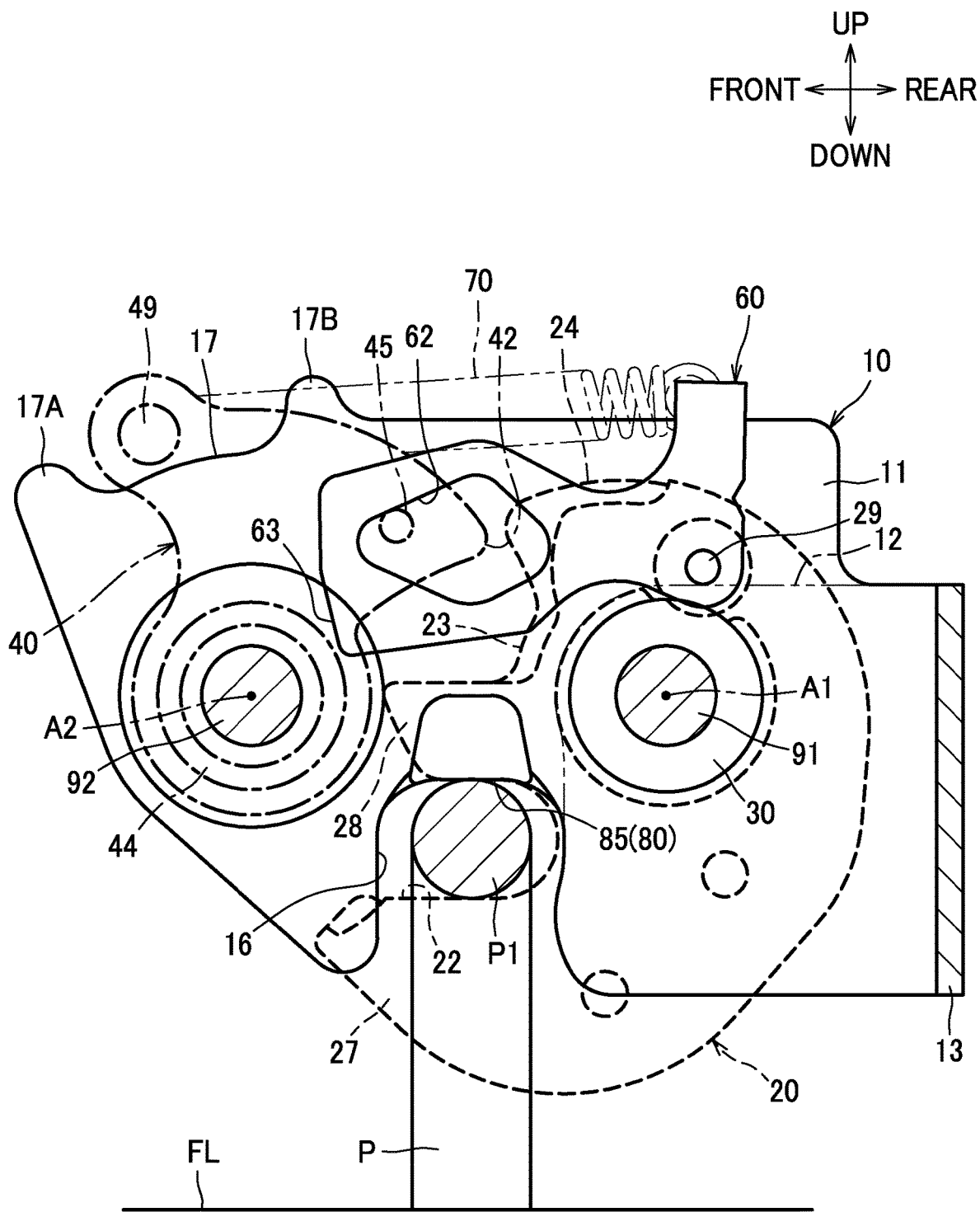
FIG. 7 is a diagram explaining the operation of the latch device.
Figure 8:
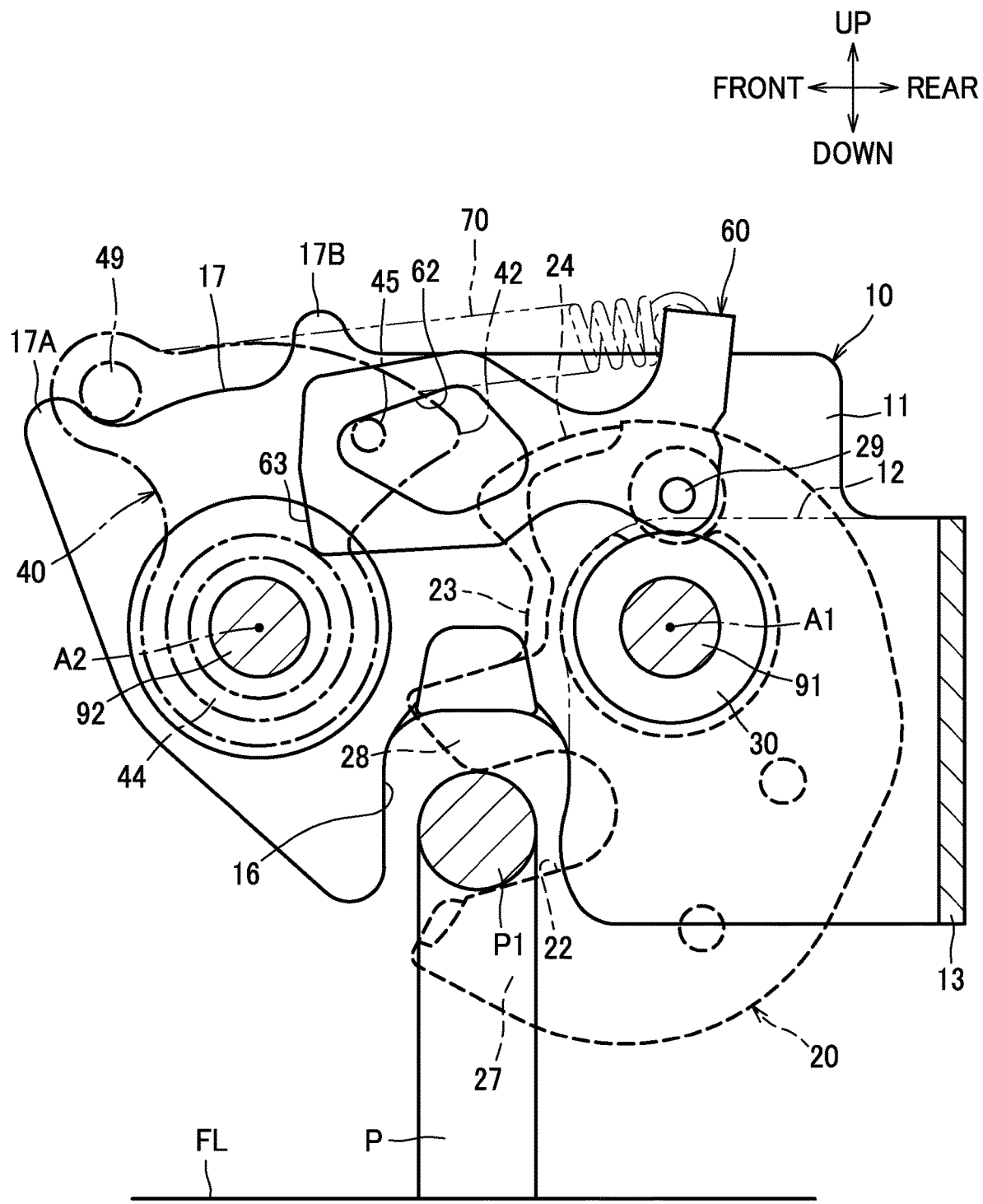
FIG. 8 is a diagram explaining the operation of the latch device.

As shown in FIG. 7, when the rivet 49 is moved forward from the locked state by operating an operating member such as a lever (not shown), the ratchet 40 rotates in the counterclockwise direction. This causes the projection 45 to press the front section of the upper edge of the guide hole 62 of the lever member 60 and rotate the lever member 60 in the clockwise direction while extending the tension spring 70. Although there is not much change in FIG. 7 compared with FIG. 3, the force applied on the lever member 60 from the ratchet 40 tends to gradually rotate the latch 20 in the counterclockwise direction via the pin 29. As shown in FIG. 8, when the rivet 49 is further moved forward, the ratchet 40 further rotates in the counterclockwise direction, and the lock engagement portion 42 is disengaged from the lock recess 23. Then, the latch 20 rotates in the counterclockwise direction by the force received from the lever member 60 via the pin 29, and the lock engagement portion 42 faces the open abutment surface 24 of the latch 20.

Figure 9:
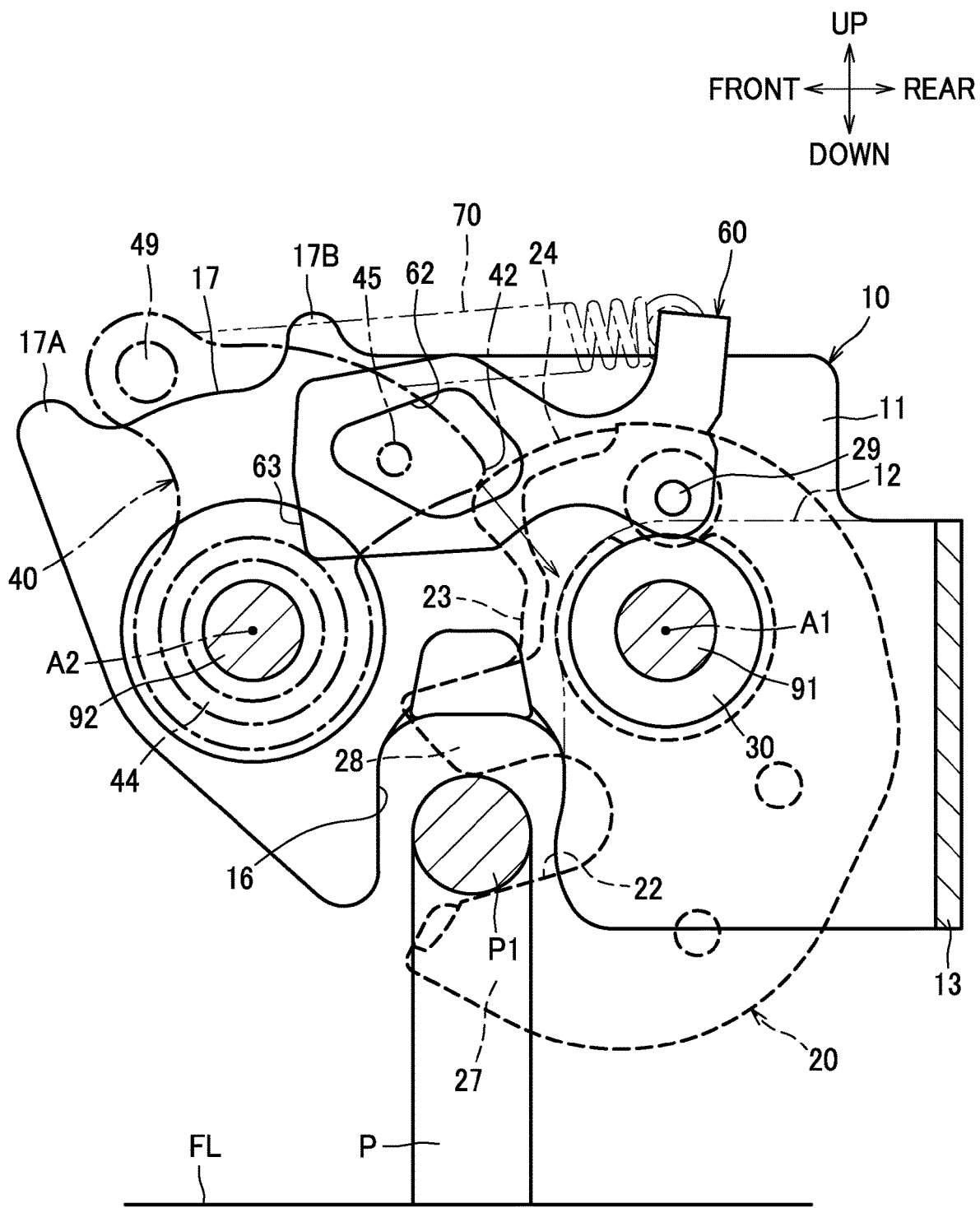
FIG. 9 is a diagram explaining the operation of the latch device.
Figure 10:
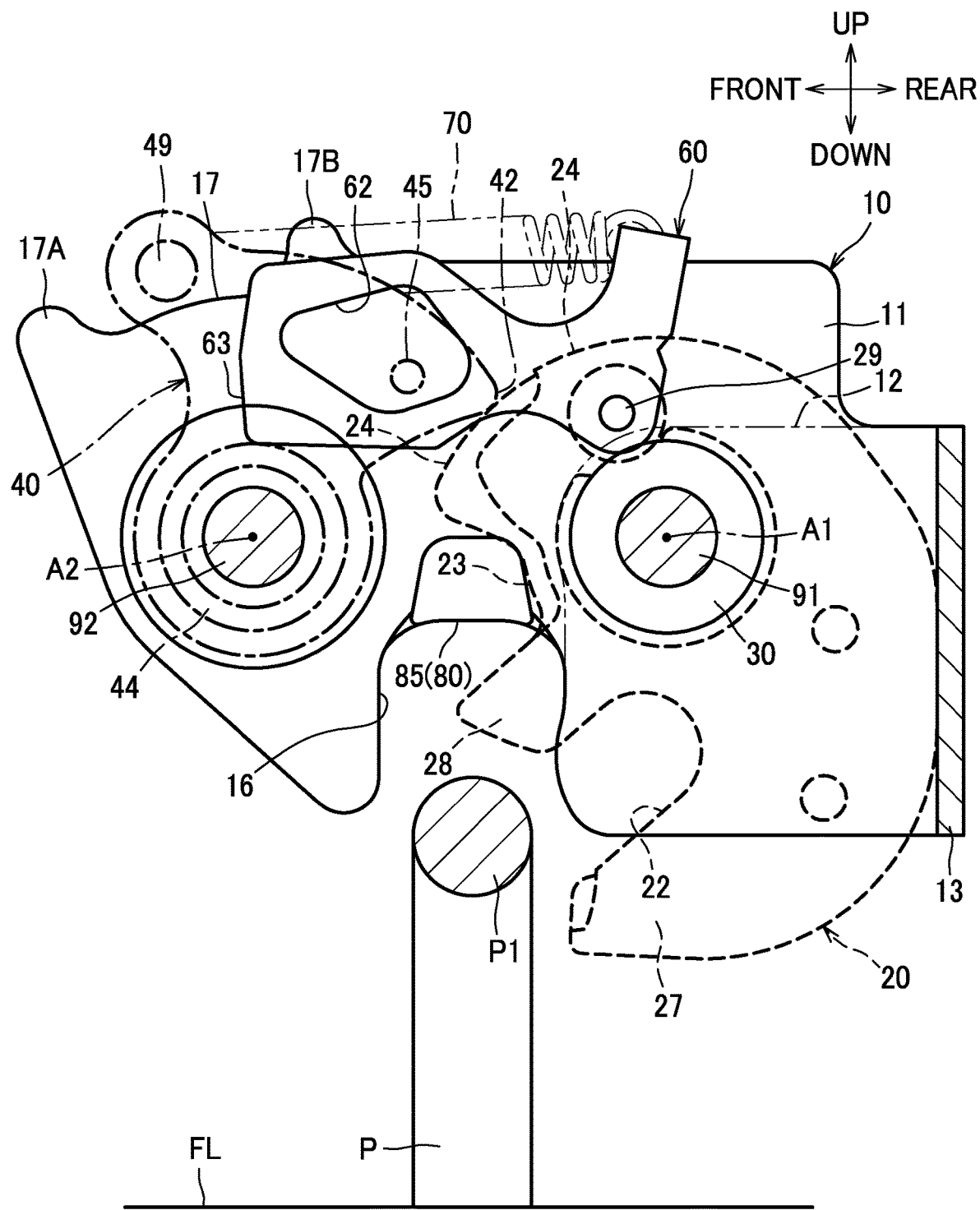
FIG. 10 is a diagram showing the latch device in an unlocked state.

As shown in FIG. 9, when the operating member is released and the rivet 49 moves rearward by the tensile force of the tension spring 70, the lock engagement portion 42 of the ratchet 40 abuts the open abutment surface 24 of the latch 20. At this point, the force of the ratchet 40 that presses the latch 20 (refer to the arrow) is directed from the contact point of the lock engagement portion 42 and the open abutment surface 24 toward the center of curvature of the open abutment surface 24. Since the center of curvature of the open abutment surface 24 is forwardly displaced from the rotational axis A1 across the range within which the open abutment surface 24 abuts the lock engagement portion 42, the force of the ratchet 40 that presses the latch 20 by the biasing force of the tension spring 70 acts as a force (a rotation moment) to rotate the latch 20 in the counterclockwise direction. When this rotation moment causes the latch 20 to rotate in the counterclockwise direction, with the open abutment surface 24 sliding along the lock engagement portion 42, as shown in FIG. 10, the latch 20 becomes disengaged from the rod portion P1 and unlocked where the rod portion P1 is disengageable from the access groove 16 of the base member 10. In the unlocked state, the outer peripheral portion of the latch 20 abuts the connecting wall 13 of the base member 10, and the latch 20 is not able to further rotate in the counterclockwise direction. That is, the connecting wall 13 limits the rotation of the latch 20 in the unlocked state.

In order to return the latch device 1 from the unlocked state to the locked state, the rod portion P1 of the striker P is placed in the access groove 16 of the base member 10 and pressed against the projection portion 28 of the latch 20, and the latch 20 is rotated in the clockwise direction. This causes the latch 20 to engage the rod portion P1. At this point, the lock engagement portion 42 of the ratchet 40 that abuts the open abutment surface 24 of the latch 20 slides along the open abutment surface 24 and enters the lock recess 23 when it reaches the lock recess 23 by the biasing force of the tension spring 70, as shown in FIG. 3. This causes the latch device 1 to return to the locked state.

In the locked state, when a load equal to or larger than a predetermined load is applied to the car seat S to move the car seat S in a frontward direction, the car seat S moves in the frontward direction and causes the latch contact surface 22A of the latch 20 to contact the rod portion P1 of the striker P. If such a load is large, the latch contact surface 22A is pressed hardly on the rod portion P1 and a large load is applied to the latch 20 from the rod portion P1 which rotates the latch 20 in the counterclockwise direction. In the present embodiment, as shown in FIGS. 11(*a*), (*b*), the base contact surface 18 of the base member 10 (the first contact surface 18A and the second contact surface 18B) and the frame contact surface F12 of the side frame F11 contact the rod portion P1 together with the latch contact surface 22A. As a result, the load from the rod portion P1 can also be received by the base member 10 and the side frame F11 in addition to the latch 20.

According to the present embodiment described above, since the base member 10 is a unitary member including the first support wall 11, the second support wall 12 and the connecting wall 13, the number of parts of the latch device 1 can be reduced compared with the case where a latch is disposed between two base members. In a configuration where a latch is disposed between two base members, it is necessary to provide a portion for fixture on each base member to fix the two base members; however, since the base member 10 is a unitary member, such a portion for fixture will become unnecessary, allowing reduction in the size and/or weight of the base member 10. This enables the reduction in size and/or weight of the latch device 1 including the base member 10. Further, by the number of parts being reduced, the cost of the latch device 1 and/or man-hours for assembly can be reduced.

Since the first shaft member 30 is fixed on the base member 10 and restricts an increase in distance between the first support wall 11 and the second support wall 12, the deformation of the base member 10 in the direction of widening of the distance between the first support wall 11 and the second support wall 12 can be minimized. The number of parts of the latch device 1 can be further reduced compared with the case where members for restricting the increase in distance between the first support wall 11 and the second support wall 12 are provided aside from the first shaft member 30. Since it is possible to reduce the size and/or weight of the base member 10 compared with the case where a member for restricting the increase in distance between the first support wall 11 and the second support wall 12 is positioned around the first shaft member 30, it is possible to reduce the size and/or the weight of the latch device 1.

Since the latch 20 has a latch contact surface 22A and the base member 10 has a base contact surface 18, the rod portion P1 of the striker P also contacts the base contact surface 18 when it contacts the latch contact surface 22A. In this way, the load from the rod portion P1 can be distributed between the latch 20 and the base member 10, and the load applied to the latch 20 can be reduced.

Since the base contact surface 18 includes the first contact surface 18A formed on the first support wall 11 and the second contact surface 18B formed on the second support wall 12, the load from the rod portion P1 can be distributed between the first support wall 11 and the second support wall 12 disposed on both sides of the latch 20. In this way, the load applied to the latch 20 can be further reduced.

Since the first support wall 11, the second support wall 12, and the connecting wall 13 form a U shape, the base member 10 including the first support wall 11, the second support wall 12, and the connecting wall 13 can be easily manufactured by bending a metal sheet, for example.

Since the first support wall 11 includes a first wall portion 11A, a second wall portion 11B, and a third wall portion 11C, a stepped shape is formed on the first support wall 11 and the rigidity of the base member 10 can thus be enhanced.

Since the first support wall 11 is configured such that the first connecting portion 11D and the second connecting portion 11E each have a shape in which two arcuate portions R1, R2 are aligned in the front-rear direction, the rigidity of the base member 10 can be further enhanced compared with the case where both connecting portions are straight.

Since the lever member 60 is a unitary member including the lever body 60A and the spring attachment portion 60B, the number of parts of the latch device 1 can be reduced compared with the case where a rivet or the like is attached for engaging the tension spring 70 to the lever member 60.

Since the seat frame F1 has a frame contact surface F12, the rod portion P1 also contacts the frame contact surface F12 when it contacts the latch contact surface 22A and the base contact surface 18. Whereby, the load from the rod portion P1 can be distributed among the latch 20, the base member 10, and the seat frame F1, and the load on the latch 20 can be further reduced.

Since the load bearing member 80 is included, the rod portion P1 abuts the load bearing surface 85 of the load bearing member 80 made of plastic and is kept from directly contacting the base member 10, and the noise produced by contact of the rod portion P1 and the base member 10 can be reduced. Further, the peeling of anticorrosive coating or the like applied on the rod portion P1 or the base member 10 can be minimized.

Since the inner peripheral surface of the first opening 21 of the latch 20 is covered with a plastic cover 20B, the sliding resistance between the inner peripheral surface of the first opening 21 and the outer peripheral surface of the first tubular portion 31 of the first shaft member 30 can be reduced, and a smooth rotation of the latch 20 can be achieved. Further, noise caused by the contact of the latch 20 and the first shaft member 30 can be reduced. Since the inner surface of the engagement groove 22 of the latch 20 is covered with a plastic cover 20B, noise caused by the contact of the rod portion P1 and the latch 20 can be reduced. To achieve the same advantageous effect, the inner peripheral surface of the second opening 41 of the ratchet 40 may be covered with plastic.

Since the reinforcing projection 11P is formed on the first support wall 11 of the base member 10, the rigidity of the base member 10 can be further enhanced. Further, since the ratchet 40 is attached to the highly rigid reinforcing projection 11P via the second shaft member 50, the ratchet 40 can be firmly attached.

Since the guide recess 17 is formed on the base member 10, the range of movement of the rivet 49 can be restricted by the end faces of the guide recess 17 (restriction projections 17A, 17B). This structure for restricting the range of movement of the rivet 49 can be easily achieved by a simple structure in which a recess (guide recess 17) is formed on the base member 10.

Although an embodiment of the present invention has been described above, the present invention is not limited to the above-described embodiment. The specific configuration may be appropriately changed as described below without departing from the gist of the invention.

For example, in the above-described embodiment, the fixing point of the seat frame F1 and the seat belt anchor SA is located in a position different from that of the bolt 91 as viewed in the direction of the rotational axis; however, this is not essential.

Figure 12:
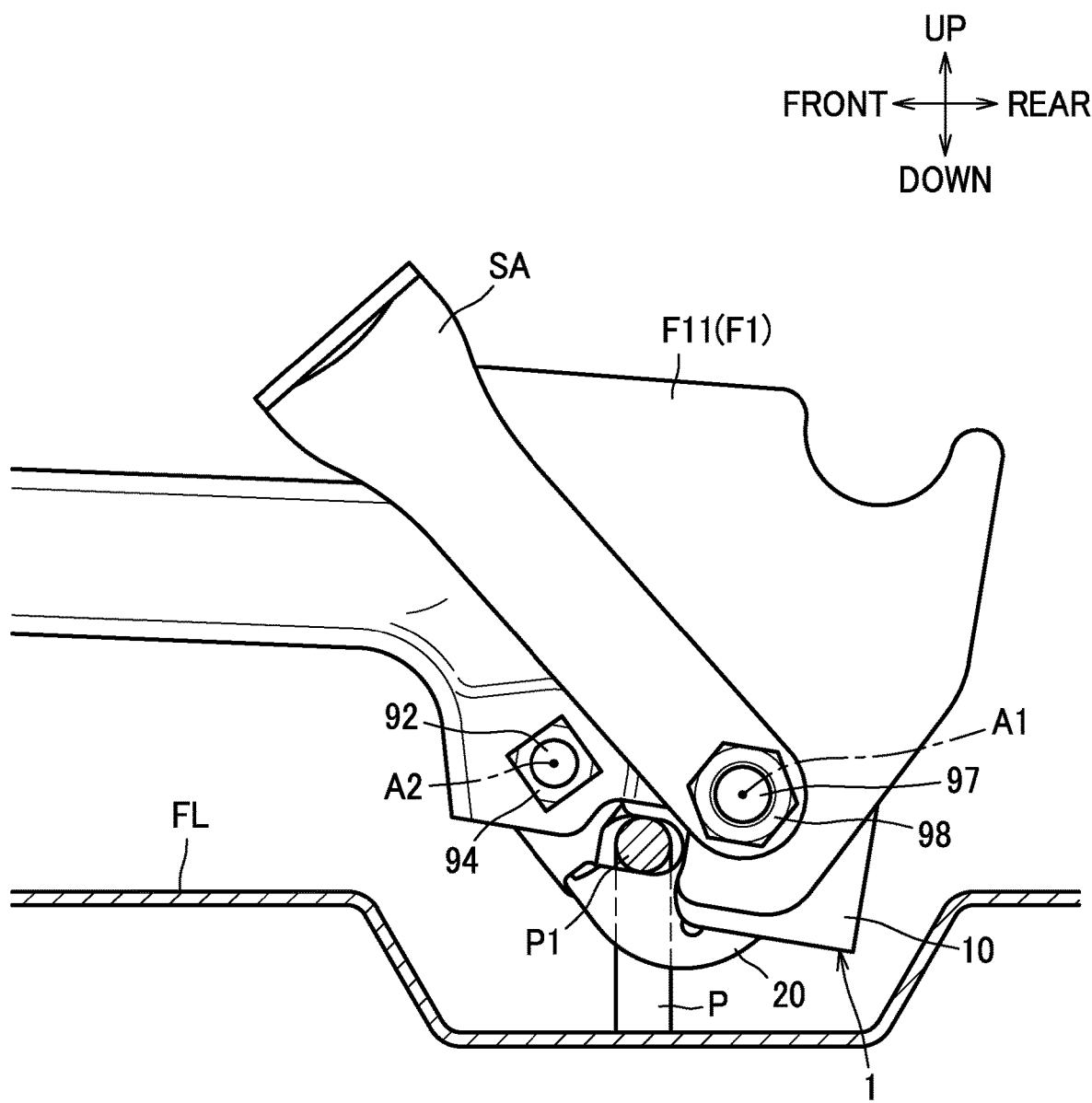
FIG. 12 is a side view of a rear end of a side frame, a latch device, and a seat belt anchor implemented as a first modification.

As shown in FIG. 12, a fixing point of the seat frame F1 and the seat belt anchor SA may be positioned in the same location as that of a bolt 97 (the rotational axis A1 of the latch 20) as the fixing member as viewed in the direction of the rotational axis. As one example, the latch device 1 and the seat belt anchor SA are fixed on the side frame F11 by the bolt 97 and a nut 98. Such a structure can serve to reduce the number of parts of the car seat S since the bolt 95 and the nut 96 of the above-described embodiment can be omitted. This enables the reduction of weight of the car seat S and/or the reduction of man-hours for assembly of the car seat S. On the other hand, as described in the above embodiment shown in FIG. 6, by locating the fixing point of the seat frame F1 and the seat belt anchor SA in a position different from that of the bolt 91 (fixing member), it is possible to reduce twisting of the latch 20 which would occur when the seat belt anchor SA is pulled, compared with the case where the latch device 1 and the seat belt anchor SA are both fixed on the seat frame F1 by the bolt 91.

In the above-described embodiment, the base member 10 is configured such that the connecting wall 13 connects the rearward ends of the first support wall 11 and the second support wall 12; however, this is not essential. For example, as shown in FIGS. 13 (a), (b), a base member 110 may be configured such that a connecting wall 113 connects the lower ends of a first support wall 111 and a second support wall 112. The first support wall 111, the second support wall 112 and the connecting wall 113 form a near U shape as viewed in the front-rear direction.

In the above-described embodiment, the first connecting portion 11D and the second connecting portion 11E of the first support wall 11 each have a shape in which two arcuate portions R1, R2 are aligned in the front-rear direction as viewed in the direction of the rotational axis; however, this is not essential. For example, the first connecting portion and the second connecting portion may each have a shape with only one arcuate portion or a shape in which three or more arcuate portions are aligned. Further, the first connecting portion and the second connecting portion may be straight or have a shape including both an arcuate portion and a straight portion as viewed in the direction of the rotational axis. The first connecting portion and the second connecting portion may have a shape different from each other as viewed in the direction of the rotational axis.

In the above-described embodiment, the first support wall 11 is configured such that the portion of the first wall portion 11A on which the ratchet 40 is attached (reinforcing projection 11P) projects relative to the other portions of the first wall portion 11A; however, this is not essential. For example, the first support wall may be configured such that the portion on which the latch is attached projects relative to the other portions. Further, the first support wall may be configured such that it does not have a projecting portion such as the reinforcing projection 11P of the above-described embodiment.

In the above-described embodiment, a stepped shape is formed in the first support wall 11 by providing the first support wall 11 with the first wall portion 11A, the second wall portion 11B, and the third wall portion 11C; however, this is not essential, and the first support wall may not have a stepped shape formed thereon, for example. Further, a stepped shape may be formed on the second support wall.

In the above-described embodiment, the base contact surface 18 includes the first contact surface 18A formed on the first support wall 11 and the second contact surface 18B formed on the second support wall 12; however, this is not essential, and the base contact surface may be formed on only one of the first support wall and the second support wall. The car seat may be configured such that it does not include a base contact surface, and a latch contact surface and a frame contact surface are contactable with the rod portion. The car seat may also be configured such that it does not include a frame contact surface, and a latch contact surface and a base contact surface are contactable with the rod portion. The car seat may also be configured not to include either a base contact surface or a frame contact surface.

In the above-described embodiment, the first shaft member 30 (shaft member) by which the latch 20 is rotatably supported restricts the increase in distance between the first support wall 11 and the second support wall 12; however this is not essential. For example, the increase in distance between the first support wall 11 and the second support wall 12 may be restricted by a member, other than a shaft member such as a rivet, positioned around the shaft member. The increase in distance between the first support wall 11 and the second support wall 12 may also be restricted by forming on at least one of the first support wall and the second support wall a portion that bends and extends toward the other support wall, aside from a connecting wall, and welding or otherwise joining that portion to the other of the first support wall and the second support wall.

In the above-described embodiment, the first shaft member 30 and the second shaft member 50 are formed like tubes, and the latch device 1 is fixed on the seat frame F1 by bolts 91, 92 passing through the tubes; however, this is not essential. For example, the latch device may be fixed to the seat frame by a bolt passing through a hole formed in the base member around a shaft member. In this case, the shaft member does not have to have a tubular shape. According to the above-described embodiment, the size and/or weight of the base member 10 can be reduced compared with the case where a bolt passes through and is fixed around the shaft member, and reduction of size and/or weight of the latch device 1 can be achieved. The fixing member is not limited to a bolt and may be a rivet or the like.

In the above-described embodiment, the lever member 60 is a unitary member including the lever body 60A and the spring attachment portion 60B; however, this is not essential, for example, a rivet or the like may be attached to a lever member and a tension spring may be engaged with this rivet. That is, the lever member and the member the tension spring is engaged with may be different members. In the above-described embodiment, with regard to the ratchet 40, the tension spring 70 is engaged with the rivet 49 connected to the ratchet 40; however, this is not essential, and a portion which is engaged with the tension spring may be unitarily formed on the ratchet. Needless to say, the biasing member is not limited to a coil spring (tension spring 70).

Figure 14:
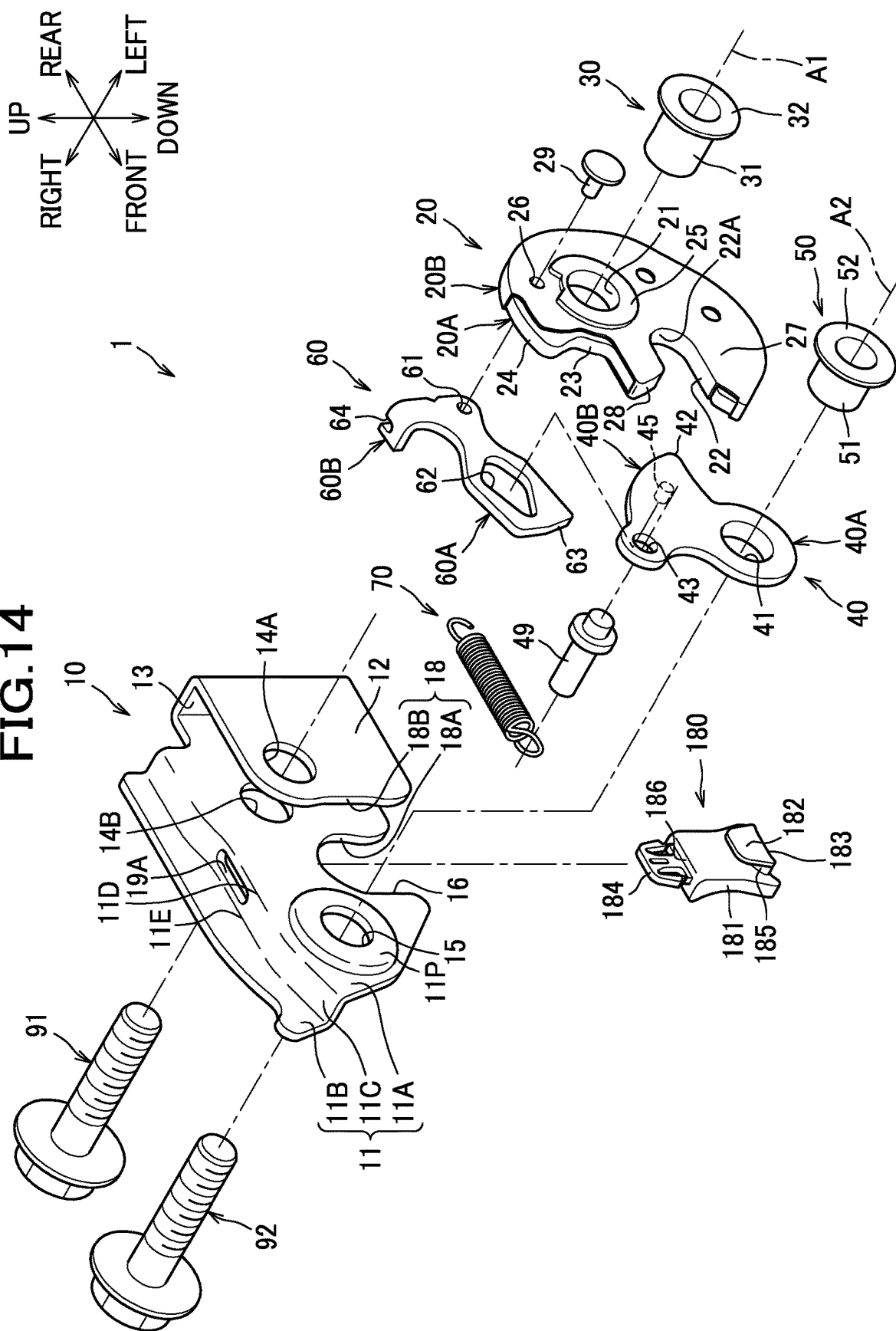
FIG. 14 is an exploded perspective view of a latch device according to a third modification.

The configuration of each member in the above-described embodiment is an example, and the members may have different configurations as long as they have similar functions. For example, as shown in FIG. 14, a load bearing member 180 may be configured to include a body portion 181, a hook portion 182, a first load bearing surface 183, an insert portion 184, a second load bearing surface 185, and a third load bearing surface 186.

Figure 15:
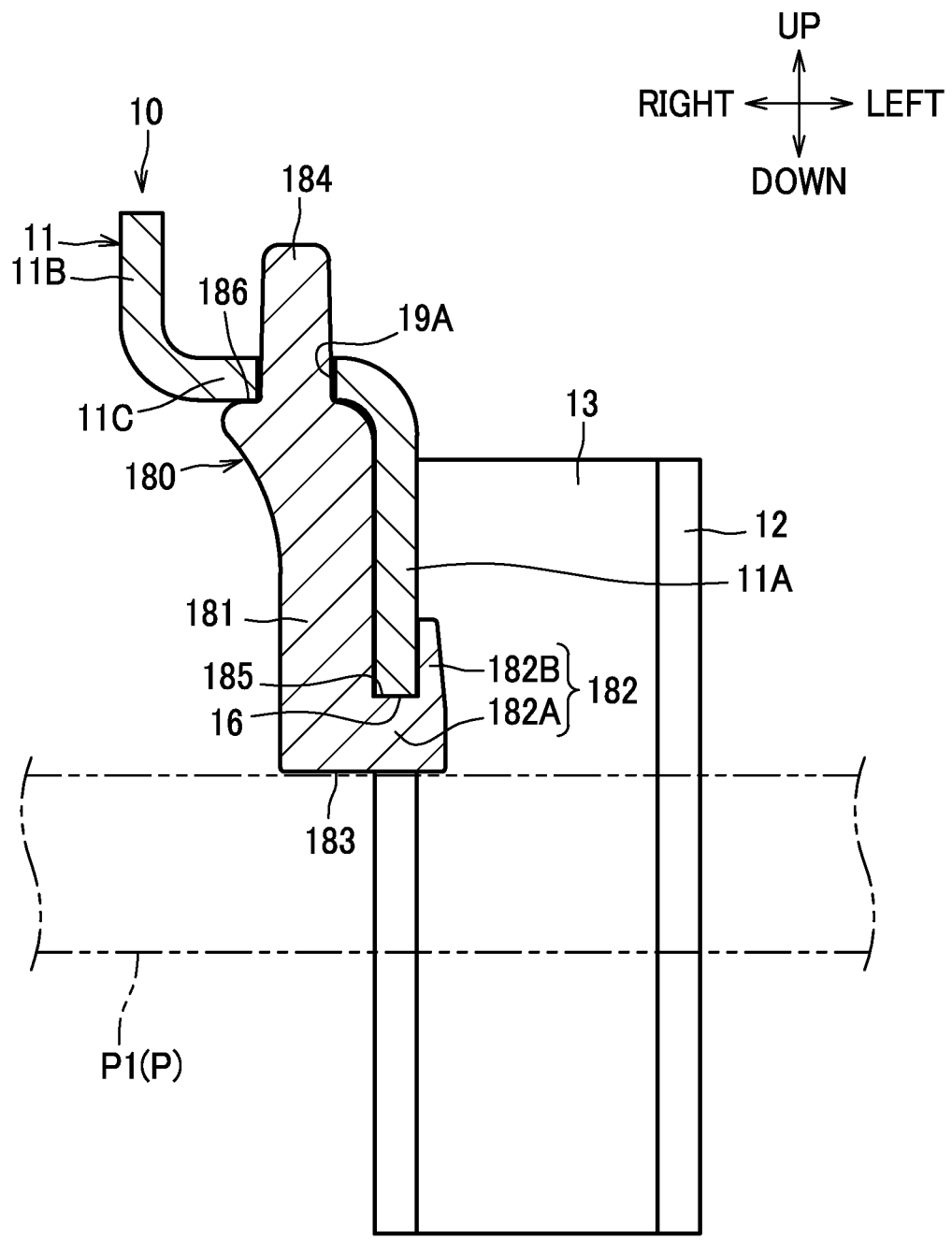
FIG. 15 is a sectional view of a load bearing member and a base member in the third modification.

The body portion 181 is provided nearly in the shape of a plate and extends approximately in the up-down direction along the first wall portion 11A of the base member 10 toward the third wall portion 11C, as shown in FIG. 15. The body portion 181 gradually increases in thickness toward the upper side thereof, as viewed from the front-rear direction.

The hook portion 182 is a portion that is engaged with the end of the first wall portion 11A opposite to the third wall portion 11C. In more detail, the hook portion 182 is engaged with the deepest portion of the access groove 16 formed in the first wall portion 11A (also refer to FIG. 16). The hook portion 182 includes an extending portion 182A which extends from the lower end of the body portion 181 in the direction of the rotational axis, and an opposing portion 182B which extends upward from the tip of the extending portion 182A and sandwiches the first wall portion 11A in cooperation with the body portion 181. The upper surface of the extending portion 182A is formed in a shape which nearly follows the shape of the bottom surface of the access groove 16.

The first load bearing surface 183 is the underside surface of the load bearing member 180 and is contactable with the rod portion P1 of the striker P located in the access groove 16, in the locked state. The first load bearing surface 183 receives a load from the rod portion P1 in a direction from the end portion of the first wall portion 11A (the deepest portion of the access groove 16) toward the third wall portion 11C, specifically, from the underside toward the upper side.

Figure 16:
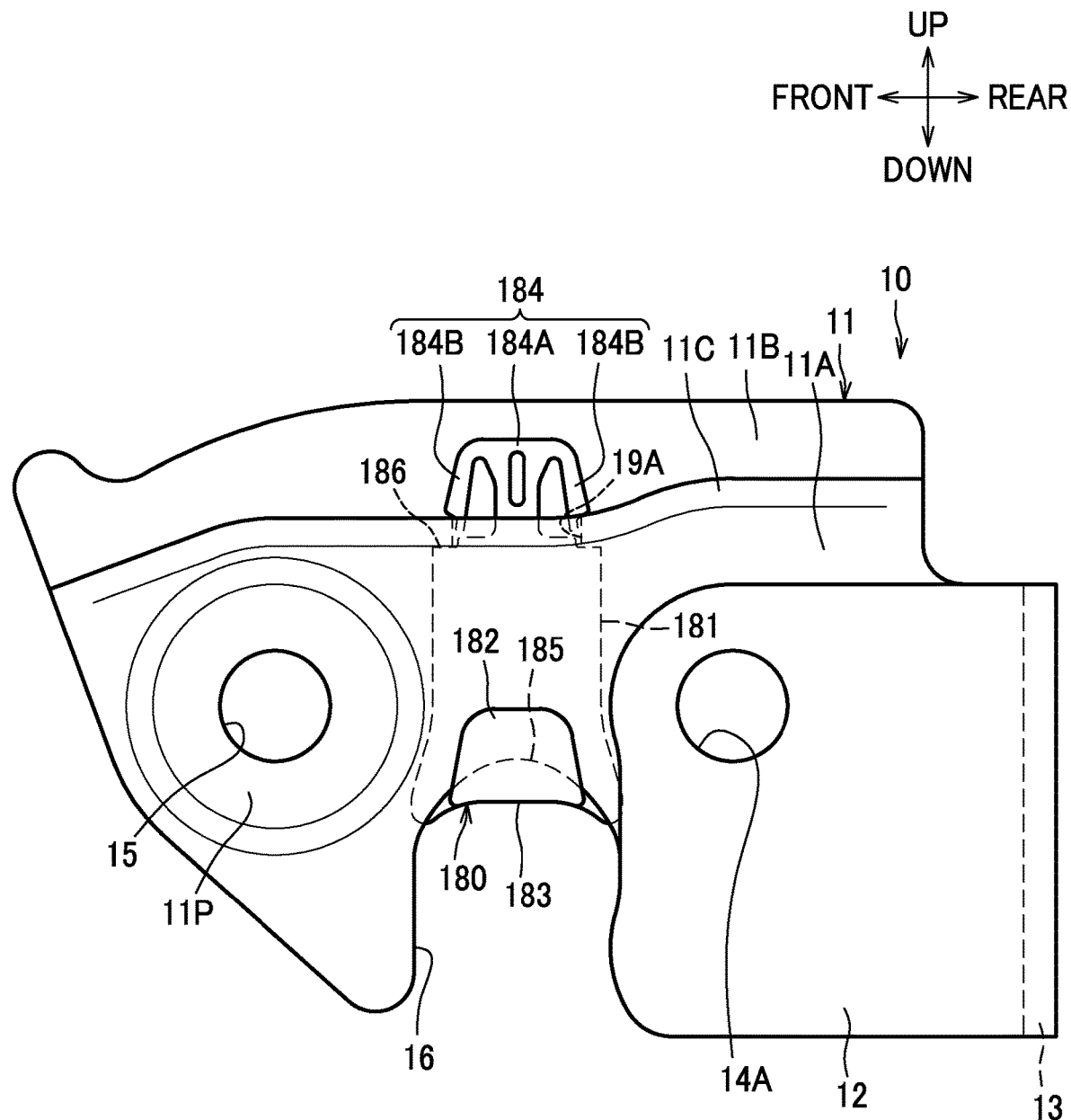
FIG. 16 is a side view of the load bearing member and the base member in the third modification.

The insert portion 184 is configured to project upwardly from the upper surface of the body portion 181. In the present modification, the base member 10 is formed with an insert hole 19A which passes through the third wall portion 11C in the up-down direction, in place of the engagement hole 19 (see FIG. 2(a)) described in the above embodiment, and the insert portion 184 is engaged with this insert hole 19A. As shown in FIG. 16, the insert portion 184 has an insert portion body 184A and a pair of front and rear claws 184B. The claws 184B extend diagonally downward from the upper end of the insert portion body 184A away from the insert portion body 184A. The insert portion 184 is configured such that the claws 184B elastically bend, and is thereby engageable with the insert hole 19A. The lower ends of the claws 184B are engaged with portions frontward and rearward of the insert hole 19A on the upper surface of the third wall portion 11C when the insert portion 184 is engaged with the insert hole 19A, and the claws 184B thereby sandwich the third wall portion 11C in cooperation with the body portion 181.

Returning to FIG. 15, the second load bearing surface 185 is an upper surface of the extending portion 182A and is contactable with an end of the first wall portion 11A, specifically, the bottom surface of the access groove 16. The second load bearing surface 185 contacts the bottom surface of the access groove 16 when the first load bearing surface 183 receives a load from the rod portion P1 of the striker P. The third load bearing surface 186 is the portion of the upper surface of the body portion 181 around the insert portion 184, and is contactable with the third wall portion 11C. The third load bearing surface 186 contacts the third wall portion 11C when the first load bearing surface 183 receives a load from the rod portion P1 of the striker P.

According to such a load bearing member 180, since the insert portion 184 is engaged in the insert hole 19A of the third wall portion 11C, it is possible to restrain the load bearing member 180 from moving in the direction of the rotational axis (particularly to restrain the body portion 181 from moving in a direction away from the first wall portion 11A) when the first load bearing surface 183 receives a load from the rod portion P1 of the striker P. In this way, the load imposed from the rod portion P1 can be stably received by the metal base member 10 via the load bearing member 180.

By providing the load bearing member 180 with a second load bearing surface 185, the load imposed on the load bearing member 180 from the rod portion P1 can be stably received by the first wall portion 11A (base member 10) via the second load bearing surface 185.

By providing the load bearing member 180 with a third load bearing surface 186, the load imposed on the load bearing member 180 from the rod portion P1 can be stably received by the third wall portion 11C (base member 10) via the third load bearing surface 186.

By providing the insert portion 184 with claws 184B which sandwich the third wall portion 11C in cooperation with the body portion 181, it is possible to restrain the load bearing member 180 from moving in the up-down direction (in the direction of thickness of the third wall portion 11C).

In the above-described embodiment, the latch device 1 is attached to the left side frame F11 of the seat frame F1; however this is not essential, for example, the latch device may be attached to the right side frame. The latch device may also be respectively attached to the right and left side frames. Further, only one latch device may be attached at or near the center of the frame of the seat cushion in the left-right direction In the above-described embodiment, the seat frame F1 is a frame of the seat cushion S1; however, this is not essential, for example, the seat frame may be a frame of a seat back. In other words, the latch device may be attached to and used with a frame of a seat back. The latch device may also be used as a device for locking a part of a car trunk or the like which opens and closes.

In the above-described embodiment, a car seat S installed on an automobile is given as an example of a vehicle seat; however, this is not essential, and the vehicle seat may be a seat installed on a vehicle other than an automobile, for example, a train, a ship, or an airplane or the like.

Each of the components described in the above embodiments and modifications may be implemented appropriately in combination.

The invention claimed is:

1. A vehicle seat comprising:
 a seat frame;
 a latch device; and
 a first fixing member that fixes the latch device to the seat frame, wherein the latch device comprises:
  a latch engageable with a rod portion provided on a vehicle, the latch device being configured to transition to a locked state in which the latch is engaged with the rod portion and to an unlocked state in which the latch is disengaged from the rod portion;
  a first shaft member that supports the latch in a manner that permits the latch to rotate; and
  a base member that supports the first shaft member, wherein the base member is formed as a one-piece member, made from a metal sheet, the one-piece member comprising a first support wall disposed on one side of the latch in a direction of a rotational axis of the latch and configured to support one end of the first shaft member, a second support wall disposed on an other side of the latch in the direction of the rotational axis and configured to support an other end of the first shaft member, and a connecting wall that connects the first support wall and the second support wall,
  wherein the latch has a through hole through which the first shaft member extends, and
  wherein the latch comprises an annular projection projecting from a periphery of the through hole in the direction of the rotational axis, a metal latch body, and a plastic cover that covers part of the metal latch body,
  wherein the annular projection is formed as part of the plastic cover and has a recess that is recessed from an outer periphery of the annular projection.

2. The vehicle seat according to claim 1, further comprising:
 a second fixing member that fixes the latch device to the seat frame;
 a ratchet configured to engage the latch to maintain the latch device in the locked state or in the unlocked state; and
 a second shaft member that supports the ratchet in a manner that permits the ratchet to rotate, wherein
  the second shaft member has a tubular shape, and
  the second fixing member extends through an interior of the tubular-shaped second shaft member to fix the latch device to the seat frame.

3. The vehicle seat according to claim 1, wherein the seat frame has a frame contact surface contactable with the rod portion when the latch device is in the locked state.

4. The vehicle seat according to claim 2, further comprising:
 a seat belt anchor fixed to the seat frame;
  wherein the second support wall and the connecting wall are located in positions that overlap a straight line extending through the rotational axis of the latch and a rotational axis of the ratchet, as viewed in the direction of the rotational axis of the latch, and
  wherein a fixing point of the seat frame and the seat belt anchor is located at a position different from a position of the first fixing member as viewed in the direction of the rotational axis of the latch, and is located between the rotational axis of the latch and the rotational axis of the ratchet in the direction in which the straight line extends.

5. A vehicle comprising the vehicle seat according to claim 1, wherein the rod portion is fixed to a body of the vehicle.

6. The vehicle seat according to claim 1, wherein
 the first shaft member has a tubular shape, and
 the first fixing member extends through an interior of the tubular-shaped first shaft member to fix the latch device to the seat frame.

7. The vehicle seat according to claim 1, wherein
 the first support wall covers a part of one side surface of the latch, and
 the second support wall covers a part of another side surface of the latch.

8. The vehicle seat according to claim 2, wherein
 the ratchet is supported on the first support wall,
 the first support wall covers a part of one side surface of the ratchet, and
 the second support wall does not cover any part of the ratchet.

9. The vehicle seat according to claim 1, wherein the first support wall, the second support wall, and the connecting wall form a U shape.

10. A method of manufacturing a vehicle seat, the method comprising:

providing a seat frame;
providing a latch device comprising:
- a latch engageable with a rod portion provided on a vehicle, the latch device being configured to transition to a locked state in which the latch is engaged with the rod portion and to an unlocked state in which the latch is disengaged from the rod portion,
- a first shaft member that supports the latch in a manner that permits the latch to rotate, and
- a base member that supports the first shaft member, the base member being formed as a one-piece member, made from a metal sheet, the one-piece member comprising a first support wall disposed on one side of the latch in a direction of a rotational axis of the latch and configured to support one end of the first shaft member, a second support wall disposed on an other side of the latch in the direction of the rotational axis and configured to support an other end of the first shaft member, and a connecting wall that connects the first support wall and the second support wall; and fixing the latch device to the seat frame by a first fixing member,
- wherein the latch has a through hole through which the first shaft member extends, and wherein the latch comprises an annular projection projecting from a periphery of the through hole in the direction of the rotational axis, a metal latch body, and a plastic cover that covers part of the metal latch body,
- wherein the annular projection is formed as part of the plastic cover and has a recess that is recessed from an outer periphery of the annular projection.

* * * * *